(12) United States Patent
Fujita et al.

(10) Patent No.: US 10,377,949 B2
(45) Date of Patent: Aug. 13, 2019

(54) LIQUID CRYSTAL COMPOSITION AND LIQUID CRYSTAL DISPLAY DEVICE

(71) Applicants: JNC CORPORATION, Tokyo (JP); JNC PETROCHEMICAL CORPORATION, Tokyo (JP)

(72) Inventors: Yukihiro Fujita, Chiba (JP); Yoshimasa Furusato, Chiba (JP)

(73) Assignees: JNC CORPORATION, Tokyo (JP); JNC PETROCHEMICAL CORPORATION, Tokyo (JP)

( * ) Notice: Subject to any disclaimer, the term of this patent is extended or adjusted under 35 U.S.C. 154(b) by 0 days.

(21) Appl. No.: 15/030,068

(22) PCT Filed: Sep. 25, 2014

(86) PCT No.: PCT/JP2014/075352
§ 371 (c)(1),
(2) Date: Apr. 17, 2016

(87) PCT Pub. No.: WO2015/060056
PCT Pub. Date: Apr. 30, 2015

(65) Prior Publication Data
US 2016/0251575 A1    Sep. 1, 2016

(30) Foreign Application Priority Data

Oct. 22, 2013  (JP) .................................. 2013-219395

(51) Int. Cl.
| C09K 19/30 | (2006.01) |
| C09K 19/54 | (2006.01) |
| C09K 19/06 | (2006.01) |
| C09K 19/32 | (2006.01) |
| C09K 19/42 | (2006.01) |
| C09K 19/44 | (2006.01) |
| C09K 19/34 | (2006.01) |
| G02F 1/1333 | (2006.01) |
| G02F 1/1337 | (2006.01) |
| G02F 1/1341 | (2006.01) |
| C09K 19/04 | (2006.01) |

(52) U.S. Cl.
CPC ......... *C09K 19/542* (2013.01); *C09K 19/062* (2013.01); *C09K 19/063* (2013.01); *C09K 19/3028* (2013.01); *C09K 19/3066* (2013.01); *C09K 19/3068* (2013.01); *C09K 19/32* (2013.01); *C09K 19/322* (2013.01); *C09K 19/3402* (2013.01); *C09K 19/42* (2013.01); *C09K 19/44* (2013.01); *G02F 1/1341* (2013.01); *G02F 1/133365* (2013.01); *G02F 1/133711* (2013.01); *G02F 1/133723* (2013.01); *G02F 1/133788* (2013.01); *C09K 2019/0448* (2013.01); *C09K 2019/0492* (2013.01); *C09K 2019/301* (2013.01); *C09K 2019/3009* (2013.01); *C09K 2019/3016* (2013.01); *C09K 2019/3021* (2013.01); *C09K 2019/3025* (2013.01); *C09K 2019/3036* (2013.01); *C09K 2019/3071* (2013.01); *C09K 2019/3078* (2013.01); *C09K 2019/3422* (2013.01); *C09K 2019/3425* (2013.01); *C09K 2019/548* (2013.01); *G02F 2001/133742* (2013.01)

(58) Field of Classification Search
CPC ....................................................... C09K 19/34
See application file for complete search history.

(56) References Cited

U.S. PATENT DOCUMENTS

| 6,130,738 | A | * | 10/2000 | Hatano | ............. | G02F 1/133377 |
| | | | | | | 349/156 |
| 6,416,825 | B1 | * | 7/2002 | Kobayashi | ......... | C09K 19/0225 |
| | | | | | | 252/299.63 |
| 9,376,621 | B2 | * | 6/2016 | Fujita | ................. | C09K 19/3066 |
| 2004/0011996 | A1 | | 1/2004 | Klasen-Memmer et al. | | |
| 2005/0116200 | A1 | | 6/2005 | Nakanishi et al. | | |
| 2010/0304049 | A1 | | 12/2010 | Bernatz et al. | | |
| 2010/0309423 | A1 | | 12/2010 | Bernatz et al. | | |
| 2012/0236246 | A1 | * | 9/2012 | Furusato | ............. | C09K 19/322 |
| | | | | | | 349/183 |

FOREIGN PATENT DOCUMENTS

| EP | 1889894 | | 2/2008 |
| JP | H5-034668 | | 2/1993 |
| JP | H11-323337 | | 11/1999 |
| JP | 2003-307720 | | 10/2003 |
| JP | 2004-131704 | | 4/2004 |
| JP | 2006-133619 | | 5/2006 |
| JP | 2009109831 | A * | 5/2009 |
| JP | 2010-537010 | | 12/2010 |
| JP | 2010-537256 | | 12/2010 |
| JP | 2012-128372 | | 7/2012 |

(Continued)

OTHER PUBLICATIONS

Berchtold et al, "Novel Monovinyl Methacrylic Monomers Containing Secondary Functionality for Ultrarapid Polymerization: Steady-State Evaluation", Macromolecules, Apr. 2004, 37, pp. 3165-3179.

(Continued)

*Primary Examiner* — Chanceity N Robinson
(74) *Attorney, Agent, or Firm* — JCIPRNET

(57) ABSTRACT

To show a liquid crystal composition containing a polymerizable compound, to exhibit excellent persistence characteristics and display unevenness characteristics, a liquid crystal display device including such a composition, and an optical device. To show a liquid crystal composition containing the polymerizable compound and satisfying at least one of characteristics such as high maximum temperature, low minimum temperature, small viscosity, suitable optical anisotropy, large negative dielectric anisotropy and large specific resistance; and an AM device having characteristics such as a small persistence ratio, a short response time, a low threshold voltage, a large voltage holding ratio, a large contrast ratio and a long service life. The liquid crystal composition contains as a first component a polymerizable monomer that has a capability of a hydrogen bond donor and can form a hydrogen bond with an alignment film surface, or an oligomer, a prepolymer or a polymer of the monomer.

17 Claims, No Drawings

(56) References Cited

FOREIGN PATENT DOCUMENTS

| JP | 2013-001834 | | 1/2013 | |
|----|----|----|----|----|
| JP | 2013001834 A | * | 1/2013 | |
| JP | WO 2013035723 A1 | * | 3/2013 | ......... H01L 51/5246 |
| WO | 2011/092973 | | 8/2011 | |
| WO | 2012/091109 | | 7/2012 | |

OTHER PUBLICATIONS

Ekisho Binran Henshuu Iinkai, "Handbook of Liquid Crystals (Ekisho Binran in Japanese)", Maruzen Co., Ltd., Nov. 2000, pp. 351-356, with English translation thereof.

Ekisho Binran Henshuu Iinkai, "Handbook of Liquid Crystals (Ekisho Binran in Japanese)", Maruzen Co., Ltd., Nov. 2000, pp. 411-415, with English translation thereof.

"International Search Report (Form PCT/ISA/210) of PCT/JP2014/075352", dated Dec. 22, 2014, with English translation thereof, pp. 1-5.

"Office Action of Taiwan Counterpart Application," with English translation thereof, dated Apr. 18, 2018, p. 1-p. 8.

"Office Action of Taiwan Counterpart Application," dated Nov. 8, 2018, with English translation thereof, p. 1-p. 7.

* cited by examiner

LIQUID CRYSTAL COMPOSITION AND LIQUID CRYSTAL DISPLAY DEVICE

CROSS-REFERENCE TO RELATED APPLICATION

This application is a 371 application of the international PCT application serial no. PCT/JP2014/075352, filed on Sep. 25, 2014, which claims the priority benefit of Japan application no. 2013-219395, filed on Oct. 22, 2013. The entirety of each of the abovementioned patent applications is hereby incorporated by reference herein and made a part of this specification.

TECHNICAL FIELD

The invention relates to a liquid crystal composition containing a polymerizable compound that is polymerized by light or heat, for example. The invention also relates to a liquid crystal display device in which the liquid crystal composition is sealed between substrates of the device, and the polymerizable compound is polymerized while voltage is applied to the device to control alignment of liquid crystal molecules due to an effect of a formed polymer.

The invention relates to a liquid crystal composition mainly suitable for use in an active matrix (AM) device and so forth, and an AM device including the composition, and so forth. In particular, the invention relates to a device in which a liquid crystal composition having a negative dielectric anisotropy is used.

BACKGROUND ART

In a liquid crystal display device, a classification based on an alignment mode for liquid crystal molecules includes a phase change (PC) mode, a twisted nematic (TN) mode, a super twisted nematic (STN) mode, an electrically controlled birefringence (ECB) mode, an optically compensated bend (OCB) mode, an in-plane switching (IPS) mode, a fringe field switching (FFS) mode, a vertical alignment (VA) mode and a polymer sustained alignment (PSA) mode. A classification based on a driving mode in the device includes a passive matrix (PM) and an active matrix (AM). The PM is classified into static, multiplex and so forth, and the AM is classified into a thin film transistor (TFT), a metal insulator metal (MIM) and so forth. The TFT is classified into amorphous silicon and polycrystal silicon. The latter is classified into a high temperature type and a low temperature type according to a production process. A classification based on a light source includes a reflective type utilizing natural light, a transmissive type utilizing backlight and a transflective type utilizing both the natural light and the backlight.

The devices include a liquid crystal composition having suitable characteristics. The liquid crystal composition has a nematic phase. General characteristics of the composition should be improved to obtain an AM device having good general characteristics. Table 1 below summarizes a relationship of the general characteristics between two aspects. The general characteristics of the composition will be further described based on a commercially available AM device. A temperature range of the nematic phase relates to a temperature range in which the device can be used. A preferred maximum temperature of the nematic phase is about 70° C. or higher, and a preferred minimum temperature of the nematic phase is about −10° C. or lower. Viscosity of the composition relates to a response time in the device. A short response time is preferred for displaying moving images on the device. Accordingly, a small viscosity in the composition is preferred. A small viscosity at a low temperature is further preferred.

TABLE 1

General Characteristics of Composition and AM Device

| No. | General Characteristics of Composition | General Characteristics of AM Device |
|---|---|---|
| 1 | Wide temperature range of a nematic phase | Wide usable temperature range |
| 2 | Small viscosity[1] | Short response time |
| 3 | Suitable optical anisotropy | Large contrast ratio |
| 4 | Large positive or negative dielectric anisotropy | Low threshold voltage and small electric power consumption Large contrast ratio |
| 5 | Large specific resistance | Large voltage holding ratio and large contrast ratio |
| 6 | High stability to ultraviolet light and heat | Long service life |

[1] A composition can be injected into a liquid crystal cell in a short period of time.

An optical anisotropy of the composition relates to a contrast ratio in the device. A product (Δn×d) of the optical anisotropy (Δn) of the composition and a cell gap (d) in the device is designed so as to maximize the contrast ratio. A suitable value of the product depends on a type of the operating mode. The suitable value is in the range of about 0.30 micrometer to about 0.40 micrometer in a device having the VA mode or the PSA mode, and in the range of about 0.20 micrometer to about 0.30 micrometer in a device having the IPS mode. In the above case, a composition having a large optical anisotropy is preferred for a device having a small cell gap. A large absolute value of dielectric anisotropy in the composition contributes to a low threshold voltage, a small electric power consumption and a large contrast ratio in the device. Accordingly, the large absolute value of dielectric anisotropy is preferred. A large specific resistance in the composition contributes to a large voltage holding ratio, and a large contrast ratio in the device. Accordingly, a composition having a large specific resistance at room temperature and also at a high temperature in an initial stage is preferred. A composition having a large specific resistance at room temperature and also at a high temperature after the device has been used for a long period of time is preferred. Stability of the composition to ultraviolet light and heat relates to a service life of the liquid crystal display device. When the stability is high, the device has a long service life. Such characteristics are preferred for an AM device for use in a liquid crystal projector, a liquid crystal television and so forth.

A composition having a positive dielectric anisotropy is used for an AM device having the TN mode. On the other hand, a composition having a negative dielectric anisotropy is used for an AM device having the VA mode. A composition having a positive or negative dielectric anisotropy is used for an AM device having the IPS mode and the FFS mode. A composition having a positive or negative dielectric anisotropy is used for an AM device having the PSA mode. With regard to the AM device having the PSA mode, examples of the liquid crystal composition having the negative dielectric anisotropy are disclosed in Patent literature Nos. 1 to 6 as described below and so forth.

CITATION LIST

Patent Literature

Patent literature No. 1: JP 2003-307720 A.
Patent literature No. 2: JP 2004-131704 A.
Patent literature No. 3: JP 2006-133619 A.
Patent literature No. 4: EP 1889894 A.
Patent literature No. 5: JP 2010-537010 A.
Patent literature No. 6: JP 2010-537256 A.

Non-Patent Literature

Non-patent literature No. 1: Macromolecules 2004, 37, 3165-3179.
Non-patent literature No. 2: Handbook of Liquid Crystals (Ekisho Binran in Japanese) (Maruzen Co., Ltd.) 2000, 351-356.
Non-patent literature No. 3: Handbook of Liquid Crystals (Ekisho Binran in Japanese) (Maruzen Co., Ltd.) 2000, 411-415.

A desirable AM device has characteristics such as a wide temperature range in which the device can be used, a short response time, a large contrast ratio, a low threshold voltage, a large voltage holding ratio and a long service life. A shorter response time even by one millisecond is desirable. Thus, desirable characteristics of a composition include a high maximum temperature of a nematic phase, a low minimum temperature of the nematic phase, a small viscosity, a suitable optical anisotropy, a large positive or negative dielectric anisotropy, a large specific resistance, a high stability to ultraviolet light and a high stability to heat.

In the liquid crystal display device having the PSA mode, a liquid crystal composition containing a polymer is used. First, a liquid crystal composition to which a small amount of polymerizable compound is added is injected into the device. Next, the composition is irradiated with ultraviolet light while voltage is applied between substrates of the device. The polymerizable compound is polymerized to form a network of the polymer in a liquid crystal-alignment film interfacial composition. In the composition, alignment of liquid crystal molecules can be controlled by the polymer having a rigid network polymer structure, and therefore a response time in the device is shortened and image persistence is improved. Such an effect of the polymer can be expected also for a device having the mode such as the TN mode, the ECB mode, the OCB mode, the IPS mode, the FFS mode and the VA mode.

Further improvement of persistence-resistant characteristics on a screen has been required for a liquid crystal composition having the PSA mode due to display performance improvement in recent years. The persistence is known to be caused by "change of a pretilt angle of liquid crystal molecules" and "residual polymerizable compounds." "Change of pretilt angle of liquid crystal molecules" is caused by a change of the network polymer structure due to use for a long period of time. In order to suppress the change, formation of the network polymer having the rigid structure is important. In order to suppress "residual polymerizable compounds," use of a polymerizable compound having excellent polymerization reactivity is effective.

In the PSA mode, a generally used polymerizable compound has a molecular structure formed of a rod-like core structure and two polymerizable functional groups. The polymerizable compound having the rod-like molecular structure is generally considered to have a high capability of aligning the liquid crystal molecules, but meanwhile has a poor solubility in the liquid crystal composition. However, on the other hand, solubility in the liquid crystal composition is poor, and addition of a large amount of the polymerizable compound thereto is not allowed. Meanwhile, Patent literature No. 6 discloses a polymerizable compound in which an asymmetric molecular structure is formed in order to improve solubility therein. The compound is improved in the solubility therein in comparison with a known polymerizable compound. However, the rigidity of the molecule is reduced in the compound, and therefore a capability of controlling the pretilt angle has reduced. A low capability of controlling the pretilt angle causes poor display such as display unevenness.

In a liquid crystal display device in which a liquid crystal composition containing a conventional polymer is used, difficulty has been caused so far in satisfying reduction of persistence characteristics or occurrence of display unevenness.

SUMMARY OF INVENTION

Technical Problem

The present inventors have diligently continued to conduct research for solving the problem, and as a result, have proposed an adhered-polymer sustained alignment (a-PSA) mode as a new alignment mode, and have invented the liquid crystal composition for the above alignment mode. A polymerizable compound having a molecular structure formed of a rod-like core structure and two polymerizable functional groups is generally used in a conventional PSA mode, whereas a polymerizable compound having a molecular structure formed of a core structure, a polymerizable group and a polar group is used in the a-PSA mode. The present inventors have found that an alignment technique using the polymerizable compound provides a composition having a high polymerization reactivity, and good pretilt angle-giving characteristics and a good compatibility with the liquid crystal composition, and have named the alignment method the a-PSA mode.

A reaction mechanism in the a-PSA mode is presumed as described below. If a polymerizable liquid crystal composition is injected into a cell, a polar group of a polymerizable compound in the liquid crystal composition and an imide group on an alignment film surface forms a hydrogen bond. The polar group of the polymerizable compound for the a-PSA mode is a hydrogen bond-donating group, and therefore the compound is adsorbed on the alignment film surface with a strong hydrogen bond. The polymerizable compound is strongly adsorbed on the alignment film surface, and thus reaction points of the polymerizable compounds come close to each other to accelerate a rate of polymerization reaction. On the other hand, a conventional polymerizable compound for the PSA mode has no hydrogen bond-donating group, and therefore no strong hydrogen bond is wanted. In addition, Non-patent literature No. 1 discloses a phenomenon in which a rate of polymerization reaction of a (meth)acrylate compound is accelerated due to presence of a hydrogen bond-donating group.

A cause due to which the a-PSA mode gives better pretilt-giving characteristics in comparison with the conventional PSA mode is supposed as described below. In the conventional PSA mode, a rigid network polymer derived from a polymerizable compound controls tilt of liquid crystal molecules to develop a good pretilt. On the other hand, in the a-PSA mode, a polymer molecular chain having the polar group derived from the polymerizable compound forms a strong hydrogen bond with an imide group on an alignment film surface. The hydrogen bond improves rigidity of the polymer molecular chain, thereby causing a higher pretilt-giving capability in the a-PSA mode in comparison with the conventional PSA mode. A polymer in which achievement of composite formation and high performance of molecules has been attempted by utilizing noncovalent interaction such as the hydrogen bond as described above is referred to as a supramolecular polymer, and is a material that has recently attracted significant attention, and has been researched in a number of institutes (Non-patent literature Nos. 2 and 3). The a-PSA mode is a new alignment technique in which the supramolecular polymer is used for pretilt formation.

The technique is named the a-PSA (adhered-polymer sustained alignment) mode because the technique has features in which the polar group of the polymer molecule adheres on the alignment film surface with the hydrogen bond.

The polymerizable compound generally used in the conventional PSA mode has a symmetric molecular structure, and therefore has a low solubility in the liquid crystal composition. On the other hand, the polymerizable compound used in the a-PSA mode of the invention has an asymmetric molecular structure, and therefore has a high solubility in the liquid crystal composition. If the asymmetric molecular structure is formed in the polymerizable compound in the prior art, the rigidity of the polymer molecule is lost, and therefore the capability of controlling the pretilt is reduced as described above (Patent literature No. 6). In the polymerizable compound used in the a-PSA mode, the polar group and an alignment film form the strong hydrogen bond to provide the polymer molecule with the rigidity, and therefore the solubility in the liquid crystal composition can be improved without adversely affecting the pretilt control capability.

One of aims of the invention is to provide a liquid crystal composition utilizing a concept of the a-PSA mode as described above to satisfy persistence characteristics or display unevenness characteristics. Another aim of the invention is to provide the liquid crystal composition, a liquid crystal display device including such a composition, and an optical device.

Solution to Problem

The above means is a liquid crystal composition containing as a first component a polymerizable monomer that has a capability of a hydrogen bond donor and can form a hydrogen bond with an alignment film surface, or containing an oligomer, a prepolymer or a polymer of the monomer.

Advantageous Effects of Invention

An advantage of the invention is a high solubility of a polymerizable compound in a liquid crystal composition. Another advantage of the invention is a liquid crystal composition satisfying at least one of characteristics such as a high polymerization reactivity, good pretilt angle-giving characteristics and a good pretilt angle stability. One aspect of the invention is a liquid crystal composition having a suitable balance regarding at least two of the characteristics. Another aspect is a liquid crystal display device including such a composition. A further aspect is an AM device having a short response time, good persistence-resistant characteristics, good display unevenness characteristics, a low threshold voltage, a large voltage holding ratio, a large contrast ratio, a long service life and so forth.

Description of Embodiments

Usage of terms herein is as described below. A liquid crystal composition or a liquid crystal display device may be occasionally abbreviated as "composition" or "device," respectively. "Liquid crystal display device" is a generic term for a liquid crystal display panel and a liquid crystal display module. A compound that can be polymerized may be occasionally abbreviated as "polymerizable compound." "Liquid crystal compound" means a compound having a liquid crystal phase such as a nematic phase and a smectic phase, or a compound having no liquid crystal phase but being useful as a component of the composition. Such a useful compound has a six-membered ring such as 1,4-cyclohexylene and 1,4-phenylene, and a rod-like molecular structure. At least one compound selected from the group of compounds represented by formula (1) may be occasionally abbreviated as "compound (1)." "Compound (1)" means one compound or two or more compounds represented by formula (1). A same rule also applies to any other compound represented by any other formula. At least one group selected from the group of groups represented by formula (P-1) may be occasionally abbreviated as "(P-1)." A same rule also applies to any other group represented by any other formula. An expression "at least one of "A" may be replaced by "B"" means that, when the number of "A" is 1, a position of "A" is arbitrary, and also when the number of "A" is two or more, positions thereof can be freely selected without restriction.

A maximum temperature of the nematic phase may be occasionally abbreviated as "maximum temperature." A minimum temperature of the nematic phase may be occasionally abbreviated as "minimum temperature." An expression "having a large specific resistance" means that the composition has a large specific resistance at room temperature and also at a temperature close to the maximum temperature of the nematic phase in an initial stage, and that the composition has a large specific resistance at room temperature and also at a temperature close to the maximum temperature of the nematic phase after the device has been used for a long period of time. An expression "having a large voltage holding ratio" means that the device has a large voltage holding ratio at room temperature and also at a temperature close to the maximum temperature of the nematic phase in an initial stage, and that the device has a large voltage holding ratio at room temperature and also at a temperature close to the maximum temperature of the nematic phase after the device has been used for a long period of time. When characteristics such as optical anisotropy are described, values obtained according to the measuring methods described in Examples will be used.

A hydrogen bond donor means a molecule having a hydrogen atom that can form a hydrogen bond with any other molecule. One example of the hydrogen bond donor includes ethanol having a hydrogen atom covalently bonded with an oxygen atom. On the other hand, a hydrogen bond acceptor means a molecule having a pair of non-covalent atoms, in which the pair of non-covalent atoms can form the hydrogen bond with the hydrogen atom of any other molecule. One example of the hydrogen bond acceptor includes diethyl ether having an oxygen atom.

A first component includes one compound or two or more compounds. "Proportion of the first component" is expressed in terms of the number of parts by weight for the weight of the first component when the total weight of the liquid crystal composition excluding the first component and the polymerizable compound other than the first component is taken as 100 parts by weight. "Proportion of a second component" is expressed in terms of weight percent (% by weight) of the second component based on the weight of the liquid crystal composition excluding the first component and the polymerizable compound other than the first component. "Proportion of a third component" is expressed in a manner similar to "proportion of the second component". A proportion of an additive mixed with the composition is expressed in terms of weight percent (% by weight) or weight parts per million (ppm) based on the total weight of the liquid crystal composition. "Proportion of the polymerizable compound other than the first component" is expressed in terms of the number of parts by weight for the weight of the polymerizable compound other than the first component when the total weight of the liquid crystal composition excluding the first component and the polymerizable compound other than the first component is taken as 100 parts by weight. A total amount of the liquid crystal composition in the invention exceeds 100% by weight in several cases.

A symbol $M^1$ is used for a plurality of compounds in chemical formulas of component compounds. In the compounds, two groups represented by two of arbitrary $M^1$ may be identical or different. For example, in one case, $M^1$ of compound (1) is hydrogen and $M^1$ of compound (1-1) is fluorine. In another case, $M^1$ of compound (1) is hydrogen and $M^1$ of compound (1-1) is methyl. A same rule also applies to $R^5$, $R^6$, $R^7$, $R^8$, $R^9$ or the like. In formula (1), when $n^1$ is 2, two of A exists. In the compound, two rings represented by two of A may be identical or different. A same rule also applies thereto when $n^1$ is larger than 2. A same rule also applies to a symbol such as L and B.

Then, 2-fluoro-1,4-phenylene means two divalent groups described below. In a chemical formula thereof, fluorine may be leftward or rightward. A same rule also applies to an asymmetrical divalent group ring such as tetrahydropyran-2,5-diyl.

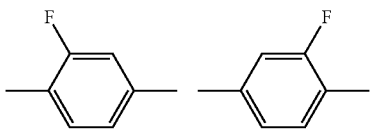

When the content shown below is described as a chemical formula, a straight line from A to B means a bond in which hydrogen in B is replaced by group A and a position thereof is arbitrary. X shows the number of groups A subjected to replacement. A case where X is 0 means that neither A exists nor any replacement by A is made.

Moreover, when the content shown below is described as a chemical formula, a straight line means a bond, the content shown by a wavy line indicates that a chemical formula subjected to replacement is omitted, and that the chemical formula is arbitrary.

The present inventors have devised the a-PSA mode being a new alignment mode satisfying persistence characteristics and display unevenness characteristics, and have found that a combination of compound (1) and a liquid crystal composition is suitable for a device having the a-PSA mode from reasons described below. More specifically, the present inventors have found that (a) compound (1) has a high solubility in the liquid crystal composition; (b) compound (1) is easily polymerized to form a polymer; (c) an amount of compound (1) remaining after a polymerization step is small; (d) the polymer provides a liquid crystal molecule with a large pretilt angle; (e) a response time of the device is short; and (f) a degree of persistence in the device is small.

The invention includes items described below.

Item 1. A liquid crystal composition containing a polymerizable monomer as a first component that has a capability of a hydrogen bond donor and can form a hydrogen bond with an alignment film surface, an oligomer of the monomer, a prepolymer of the monomer or a polymer of the monomer.

Item 2. The liquid crystal composition according to item 1, containing as the first component a monomer having:
(a) one or more ring structures;
(b) one or more polar groups; and
(c) one or more polymerizable groups in one molecule, an oligomer of the monomer, a prepolymer of the monomer or a polymer of the monomer.

Item 3. The liquid crystal composition according to item 1 or 2, containing at least one compound selected from the group of compounds represented by formula (1) as the first component:

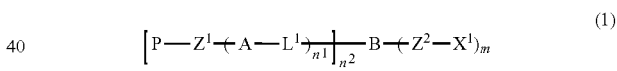

wherein, in formula (1), P is a polymerizable group having 3 to 20 carbons and one or more groups as selected from α,β-unsaturated ester and cyclic ether, in which at least one of hydrogen may be replaced by halogen; A is a divalent group derived from a ring selected from adamantane, noradamantane, diamantane, triamantane, norbornene, norbornane, phthalan, coumaran, 1,2-methylenedioxybenzene, chroman, benzene, naphthalene, cyclohexane, cyclohexene, tetrahydropyran, dioxane, pyrimidine and pyridine, or a single bond, in which at least one of hydrogen may be replaced by halogen, alkyl having 1 to 12 carbons, or alkyl having 1 to 12 carbons in which at least one of hydrogen is replaced by halogen, B is a $(n^2+m)$-valent group derived from a ring selected from adamantane, noradamantane, diamantane, triamantane, norbornene, norbornane, phthalan, coumaran, 1,2-methylenedioxybenzene, chroman, benzene, naphthalene, cyclohexane, cyclohexene, tetrahydropyran, dioxane, pyrimidine and pyridine, or a single bond, in which at least one of hydrogen may be replaced by halogen, alkyl having 1 to 12 carbons, or alkyl having 1 to 12 carbons in which at least one of hydrogen is replaced by halogen;
$X^1$ is —H, —OH, —COOH, —NH$_2$, —NHR$^1$, —SH or a substituent derived from a heterocycle having 3 to 20 carbons and containing one or more of —NH—, and in the heterocycle, at least one of hydrogen may be replaced by halogen, in which, when both A and B are a single bond, $X^1$ is a substituent derived from a heterocycle having 3 to 20 carbons and containing at least one of —NH—, and in the heterocycle, at least one of hydrogen may be replaced by halogen; $R^1$ is alkyl having 1 to 6 carbons; $Z^1$ and $Z^2$ are independently a single bond or alkylene having 1 to 10 carbons, and in the alkylene, at least one of —$CH_2$— may be replaced by —O—, —COO—, —OCO— or —OCOO—, at least one of —$CH_2$—$CH_2$— may be replaced by —CH=CH— or —C≡C—, and when P is a polymerizable group having a cyclic ether group, $Z^1$ is alkylene having 1 to 10 carbons in which at least one of —$CH_2$— is replaced by —O—, —COO—, —OCO— or —OCOO—, and when $X^1$ is hydrogen, $Z^1$ is alkylene having 1 to 10 carbons in which at least one of hydrogen is replaced by —OH or —COOH; $L^1$ is a single bond or alkylene having 1 to 10 carbons, and in the alkylene, at least one of —$CH_2$— may be replaced by —O—, —COO—, —OCO— or —OCOO—, and at least one of —$CH_2$—$CH_2$— may be replaced by —CH=CH— or —C≡C—; m is 1, 2 or 3; $n^1$ is 0, 1, 2, 3 or 4; $n^2$ is 1, 2 or 3; and ($n^2$+m) is an integer from 2 to 5.

Item 4. The liquid crystal composition according to any one of items 1 to 3, wherein in formula (1) described in item 3, P is a group selected from groups represented by formulas (P-1) to (P-4):

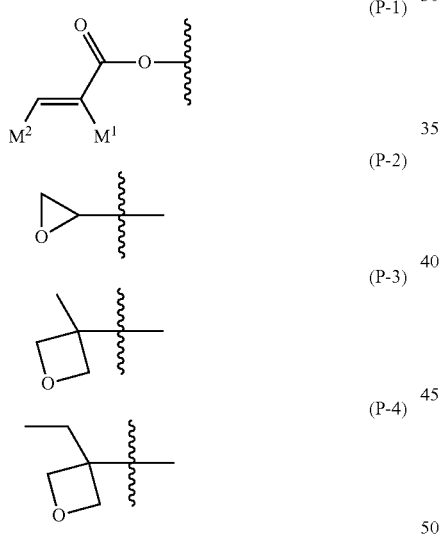

wherein, in formula (P-1), $M^1$ and $M^2$ are independently hydrogen, fluorine, methyl or trifluoromethyl;

A is a divalent group derived from a ring as selected from adamantane, noradamantane, diamantane, norbornane, benzene and naphthalene, or a single bond, in which at least one of hydrogen may be replaced by halogen, alkyl having 1 to 6 carbons, or alkyl having 1 to 6 carbons in which at least one of hydrogen is replaced by halogen, B is a ($n^2$+m)-valent group derived from a ring as selected from adamantane, noradamantane, diamantane, norbornane, benzene and naphthalene, or a single bond, in which at least one of hydrogen may be replaced by halogen, alkyl having 1 to 6 carbons, or alkyl having 1 to 6 carbons in which at least one of hydrogen is replaced by halogen;

$X^1$ is —H, —OH, —COOH, —$NH_2$, —$NHR^1$, —SH or a group represented by formulas (X-1) to (X-3), in which, when both A and B are a single bond, $X^1$ is a group represented by formulas (X-1) to (X-3), and $R^1$ is alkyl having 1 to 4 carbons;

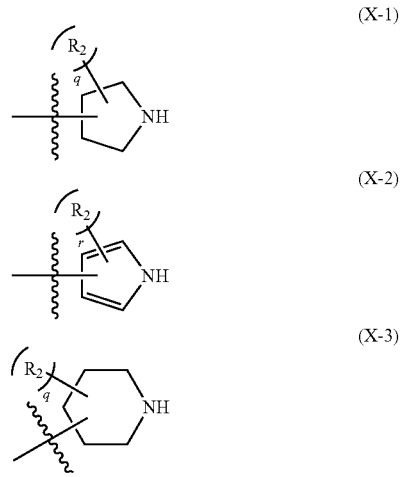

wherein, $R^2$ is alkyl having 1 to 4 carbons; $Z^1$ and $Z^2$ are independently a single bond or alkylene having 1 to 4 carbons, and in the alkylene, at least one of —$CH_2$— may be replaced by —O—, —COO—, —OCO— or —OCOO—, and when $X^1$ is a group represented by —H, $Z^1$ has —OH or —COOH;

$L^1$ is a single bond or alkylene having 1 to 4 carbons, and in the alkylene, at least one of —$CH_2$— may be replaced by —O—, —COO—, —OCO— or —OCOO—, and at least one of —$CH_2$—$CH_2$— may be replaced by —CH=CH— or —C≡O—; m is 1 or 2; n is 0, 1 or 2; q is 0, 1, 2, 3 or 4; r is 0, 1, 2 or 3; and ($n^2$+m) is an integer from 2 to 5.

Item 5. The liquid crystal composition according to any one of items 1 to 4, wherein the first component is at least one compound selected from the group of compounds represented by formulas (1-1) to (1-3):

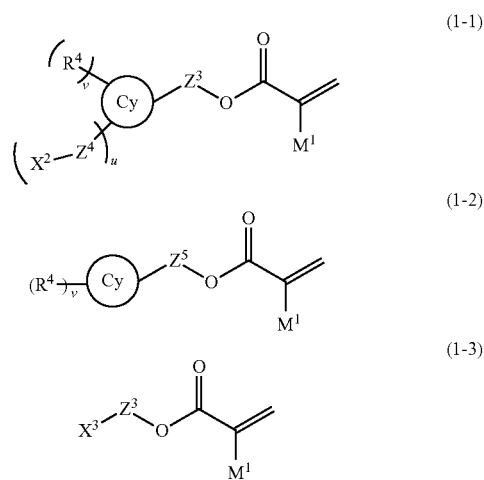

wherein, Cy is a $w^2$-valent group derived from a ring selected from adamantane, benzene, naphthalene, norbornane and biphenyl; $M^1$ is methyl or hydrogen; $R^4$ is alkyl having 1 to 3 carbons; $X^2$ is —OH, —COOH, —$NH_2$, —NHR$^1$ or —SH; X$^3$ is a group represented by formulas (X-1) to (X-3) described in item 4; and R$^1$ is alkyl having 1 to 4 carbons;

Z$^3$ and Z$^4$ are independently a single bond or alkylene having 1 to 4 carbons, and in the alkylene, at least one of —CH$_2$— may be replaced by —O—, —COO—, —OCO— or —OCOO—; Z$^5$ is alkylene having 1 to 4 carbons, and in the alkylene, one or two of hydrogens are replaced by —OH or —COOH, and at least one of —CH$_2$— may be replaced by —O—, —COO—, —OCO— or —OCOO—; u is 1 or 2; v is 0, 1 or 2; w$^2$ is an integer from 2 to 5; q is 0, 1, 2, 3 or 4; and r is 0, 1 or 2.

Item 6. The liquid crystal composition according to any one of items 1 to 5, wherein, in formulas (1-1) to (1-3) described in item 5, X$^2$ is —OH, —COOH or —NH$_2$; Z$^3$ and Z$^4$ are a single bond; and Z$^5$ is alkylene having 1 to 2 carbons, and in the alkylene, one or two of hydrogens are replaced by —OH or —COOH, and at least one of —CH$_2$— may be replaced by —O—, —COO—, —OCO— or —OCOO—.

Item 7. The liquid crystal composition according to any one of items 1 to 6, wherein the first component is at least one compound selected from the group of compounds represented by formulas (1-1-1), (1-1-2), (1-1-3), (1-2-1) and (1-3-1):

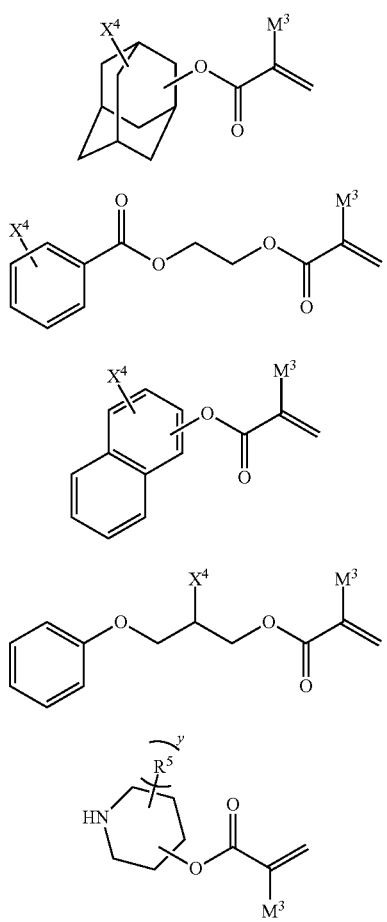

wherein, X$^4$ is —OH or —COOH; M$^3$ is hydrogen or methyl; R$^5$ is methyl or ethyl; and y is 0, 1, 2, 3 or 4.

Item 8. The liquid crystal composition according to any one of items 1 to 7, containing a compound represented by formula (1-1-1) described in item 7.

Item 9. The liquid crystal composition according to any one of items 1 to 8, further containing at least one compound selected from the group of compounds represented by formula (2) as a second component:

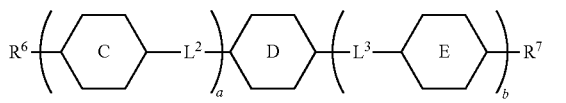

(2)

wherein, R$^6$ and R$^7$ are independently alkyl having 1 to 12 carbons, alkoxy having 1 to 12 carbons or alkenyl having 2 to 12 carbons, or alkenyl having 2 to 12 carbons in which at least one of hydrogen is replaced by fluorine; C and E are independently 1,4-cyclohexylene, 1,4-phenylene, 1,4-phenylene in which at least one of hydrogen is replaced by fluorine or chlorine, or tetrahydropyran-2,5-diyl; D is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; L$^2$ and L$^3$ are independently a single bond, ethylene, methyleneoxy or carbonyloxy; a is 1, 2 or 3; b is 0 or 1; and a sum of a and b is 3 or less.

Item 10. The liquid crystal composition according to any one of items 1 to 9, wherein the second component is at least one compound selected from the group of compounds represented by formulas (2-1) to (2-19):

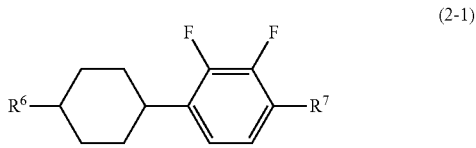

(2-1)

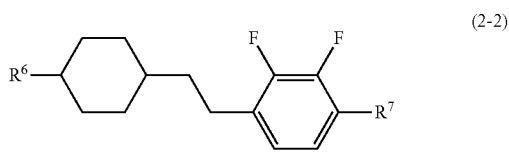

(2-2)

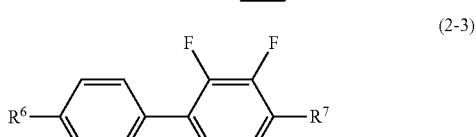

(2-3)

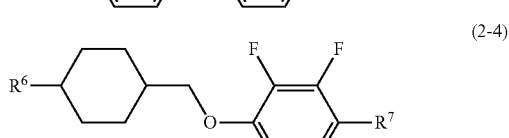

(2-4)

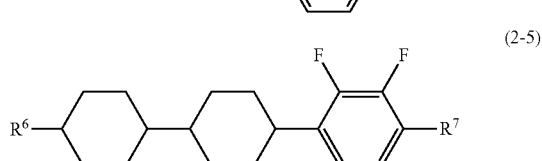

(2-5)

(2-6) 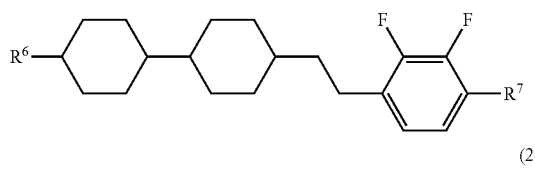

(2-7) 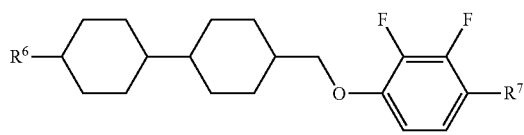

(2-8) 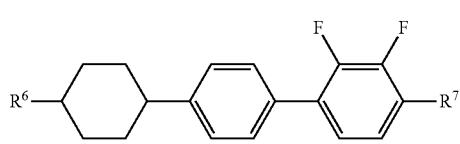

(2-9) 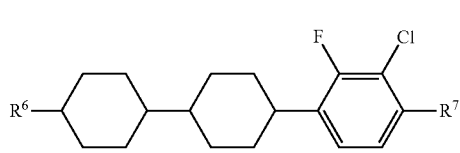

(2-10) 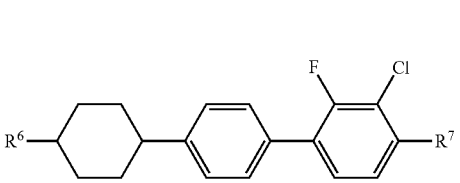

(2-11) 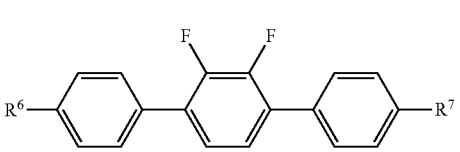

(2-12) 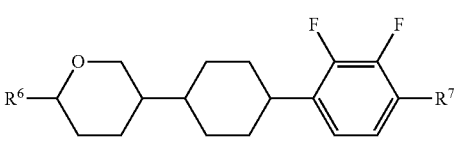

(2-13) 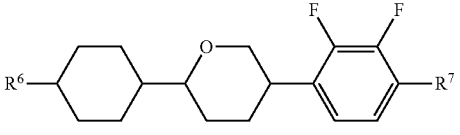

(2-14) 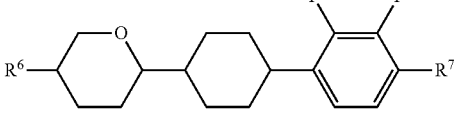

(2-15) 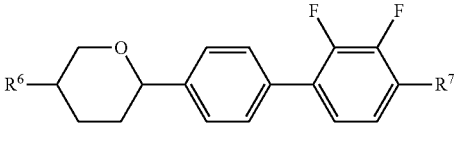

(2-16) 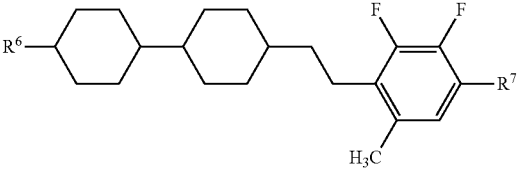

(2-17) 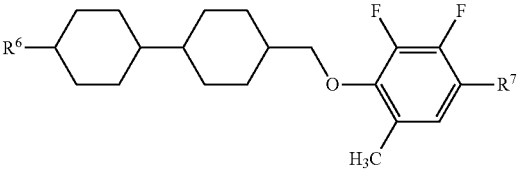

(2-18) 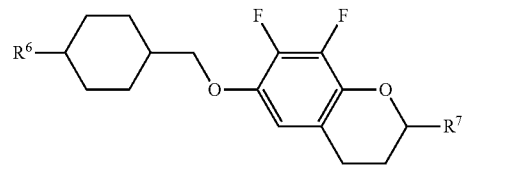

(2-19) 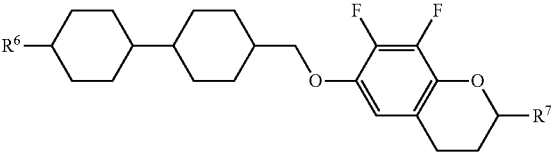

wherein, $R^6$ and $R^7$ are independently alkyl having 1 to 12 carbons, alkoxy having 1 to 12 carbons or alkenyl having 2 to 12 carbons.

Item 11. The liquid crystal composition according to any one of items 1 to 10, containing at least one compound selected from the group of compounds represented by formula (2-3) described in item 10 as the second component.

Item 12. The liquid crystal composition according to any one of items 1 to 10, containing at least one compound selected from the group of compounds represented by formula (2-5) described in item 10 as the second component.

Item 13. The liquid crystal composition according to any one of items 1 to 10, containing at least one compound selected from the group of compounds represented by formula (2-7) described in item 10 as the second component.

Item 14. The liquid crystal composition according to any one of items 1 to 10, containing at least one compound selected from the group of compounds represented by formula (2-8) described in item 10 as the second component.

Item 15. The liquid crystal composition according to any one of items 1 to 14, wherein a proportion of the second component is in the range of 10% by weight to 100% by weight, based on the weight of a liquid crystal composition excluding the first component and a polymerizable compound other than the first component, a proportion of the first component when the weight of the liquid crystal composition excluding the first component and the polymerizable compound other than the first component is taken as 100 parts by weight is in the range of 0.05 part by weight to 10 parts by weight, and a sum of the proportion of the first component and a proportion of the polymerizable compound other than the first component is in the range of 0.05 part by weight to 10 parts by weight.

Item 16. The liquid crystal composition according to any one of items 1 to 15, further containing at least one compound selected from the group of compounds represented by formula (3) as a third component:

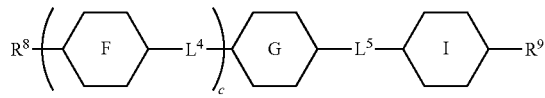
(3)

wherein, $R^8$ and $R^9$ are independently alkyl having 1 to 12 carbons, alkoxy having 1 to 12 carbons or alkenyl having 2 to 12 carbons, or alkenyl having 2 to 12 carbons in which at least one of hydrogen is replaced by fluorine; F, G and I are independently 1,4-cyclohexylene, 1,4-phenylene, 2-fluoro-1,4-phenylene or 3-fluoro-1,4-phenylene; $L^4$ and $L^5$ are independently a single bond, ethylene, methyleneoxy or carbonyloxy; and c is 0, 1 or 2.

Item 17. The liquid crystal composition according to any one of items 1 to 16, containing at least one compound selected from the group of compounds represented by formulas (3-1) to (3-13) as the third component:

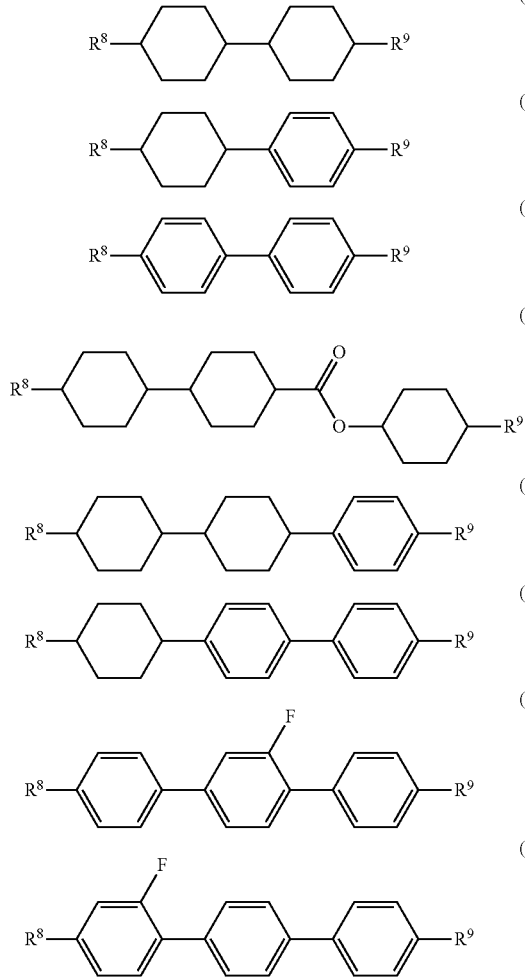

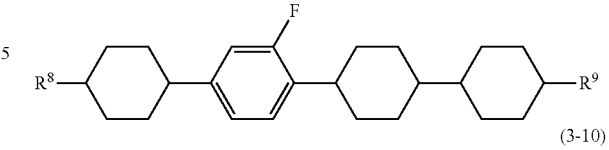
(3-9)

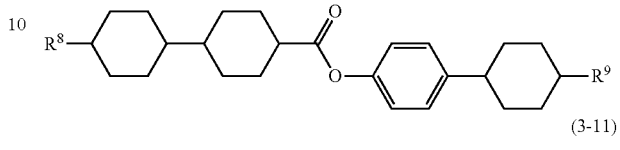
(3-10)

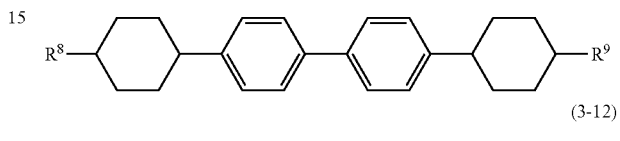
(3-11)

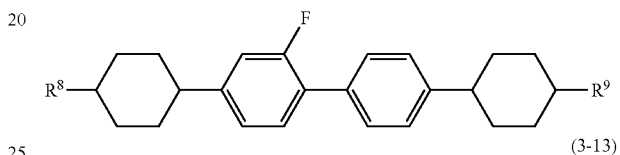
(3-12)

(3-13)

wherein, $R^8$ and $R^9$ are independently alkyl having 1 to 12 carbons, alkoxy having 1 to 12 carbons or alkenyl having 2 to 12 carbons, or alkenyl having 2 to 12 carbons in which at least one of hydrogen is replaced by fluorine.

Item 18. The liquid crystal composition according to any one of items 1 to 17, containing at least one compound selected from the group of compounds represented by formula (3-1) described in item 17 as the third component.

Item 19. The liquid crystal composition according to any one of items 1 to 17, containing at least one compound selected from the group of compounds represented by formula (3-8) described in item 17 as the third component.

Item 20. The liquid crystal composition according to any one of items 16 to 19, wherein a proportion of a second component is in the range of 10% by weight to 80% by weight, based on the weight of a liquid crystal composition excluding a first component and a polymerizable compound other than the first component, a proportion of the third component is in the range of 20% by weight to 90% by weight, a proportion of the first component when the weight of the liquid crystal composition excluding the first component and the polymerizable compound other than the first component is taken as 100 parts by weight is in the range of 0.05 part by weight to 10 parts by weight, and a proportion of the polymerizable compound is in the range of 0.05 part by weight to 10 parts by weight.

Item 21. The liquid crystal composition according to any one of items 1 to 20, further containing a polymerization initiator.

Item 22. The liquid crystal composition according to any one of items 1 to 21, further containing a polymerization inhibitor.

Item 23. The liquid crystal composition according to any one of items 1 to 22, wherein a maximum temperature of a nematic phase is 70° C. or higher, an optical anisotropy (25°

C.) at a wavelength of 589 nanometers is 0.08 or more, and a dielectric anisotropy (25° C.) at a frequency of 1 kHz is −2 or less.

Item 24. A polymer sustained alignment mode liquid crystal display device, wherein the liquid crystal display device is formed of two substrates having an electrode layer on at least one of the substrates, and a liquid crystal material containing a compound in which a polymerizable compound in the liquid crystal composition according to any one of items 1 to 23 is polymerized is arranged between the two substrates.

Item 25. The liquid crystal display device according to item 24, wherein a driving mode in the liquid crystal display device is an active matrix mode.

Item 26. A method for manufacturing a liquid crystal display device, wherein the liquid crystal display device according to item 24 is manufactured by irradiating, with light, the liquid crystal composition according to any one of items 1 to 23 arranged between two substrates in a state of voltage application to polymerize a polymerizable compound.

Item 27. Use of the liquid crystal composition according to any one of items 1 to 23 in a liquid crystal display device.

The invention further includes the following items: (1) the composition, wherein a second component is a mixture of at least one compound selected from the group of compounds represented by formula (2-1) and at least one compound selected from the group of compounds represented by formula (2-7); (2) the composition, wherein a second component is a mixture of at least one compound selected from the group of compounds represented by formula (2-3) and at least one compound selected from the group of compounds represented by formula (2-7); (3) the composition, wherein a second component is a mixture of at least one compound selected from the group of compounds represented by formula (2-1), at least one compound selected from the group of compounds represented by formula (2-5) and at least one compound selected from the group of compounds represented by formula (2-8); (4) the composition, wherein a third component is a mixture of at least one compound selected from the group of compounds represented by formula (3-1) and at least one compound selected from the group of compounds represented by formula (3-3); and (5) the composition, wherein a third component is a mixture of at least one compound selected from the group of compounds represented by formula (3-1) and at least one compound selected from the group of compounds represented by formula (3-5).

The invention further includes the following items: (1) the composition, further containing an optically active compound; (2) the composition, further containing an additive such as an antioxidant, an ultraviolet light absorber and an antifoaming agent; (3) an AM device, including the composition; (4) a device including the composition, and having a TN, ECB, OCB, IPS, FFS, VA, PSA or a-PSA mode; (5) a transmissive device, including the composition; (6) use of the composition as a composition having a nematic phase; and (7) use as an optically active composition by adding an optically active compound to the composition.

The composition of the invention will be described in the following order. First, a constitution of component compounds in the composition will be described. Second, main characteristics of the component compounds and main effects of the compounds on the composition will be described. Third, a combination of components in the composition, a preferred proportion of the components and the basis thereof will be described. Fourth, a preferred embodiment of the component compounds will be described. Fifth, specific examples of the component compounds will be shown. Sixth, an additive that may be mixed with the composition will be described. Seventh, methods for synthesizing the component compounds will be described. Last, an application of the composition will be described.

First, the constitution of the component compounds in the composition will be described. The composition of the invention is classified into composition A and composition B. Composition A may further contain any other liquid crystal compound, the additive, an impurity or the like in addition to the liquid crystal compound selected from compound (1), compound (2) and compound (3). "Any other liquid crystal compound" means a liquid crystal compound different from compound (1), compound (2) and compound (3). Such a compound is mixed with the composition for the purpose of further adjusting the characteristics. Of any other liquid crystal compounds, a proportion of a cyano compound is preferably as small as possible in view of stability to heat or ultraviolet light. A further preferred proportion of the cyano compound is 0% by weight. The additive includes the optically active compound, the antioxidant, the ultraviolet light absorber, a dye, the antifoaming agent and the polymerization initiator. The impurity includes a compound mixed in a process such as preparation of the component compounds. Even in the case where the compound is liquid crystalline, the compound is classified as the impurity herein.

Composition B consists essentially of compound (1), compound (2), and compound (3). A term "essentially" means that the composition may contain the additive and the impurity, but does not contain any liquid crystal compound different from the above compounds. Composition B has a smaller number of components than composition A has. Composition B is preferred to composition A in view of cost reduction. Composition A is preferred to composition B in view of possibility of further adjusting physical properties by mixing any other liquid crystal compound.

Second, the main characteristics of the component compounds and the main effects of the compounds on the characteristics of the composition will be described. The main characteristics of the component compounds are summarized in Table 2 on the basis of advantageous effects of the invention. In Table 2, a symbol L stands for "large" or "high", a symbol M stands for "medium", and a symbol S stands for "small" or "low". The symbols L, M and S represent a classification based on a qualitative comparison among the component compounds, and 0 (zero) means "value is nearly zero."

TABLE 2

| Characteristics of Compounds | | |
| --- | --- | --- |
| Compounds | (2) | (3) |
| Maximum temperature | S to L | S to L |
| Viscosity | M to L | S to M |
| Optical anisotropy | M to L | S to L |
| Dielectric anisotropy | M to L[1)] | 0 |
| Specific resistance | L | L |

[1)]A value of dielectric anisotropy is negative, and the symbol shows magnitude of an absolute value.

Upon mixing the component compounds with the composition, the main effects of the component compounds on the characteristics of the composition are as described below. Compound (2) increases an absolute value of dielectric anisotropy and decreases the minimum temperature.

Compound (3) decreases the viscosity, increases the maximum temperature or decreases the minimum temperature.

Third, the combination of the components in the composition, the preferred proportion of the components and the basis thereof will be described. The combination of the components in the composition includes a combination of the first component and the second component, and a combination of the first component, the second component and the third component.

A preferred proportion of the first component is about 0.05 part by weight or more, based on the weight of the liquid crystal composition composed of the second component and the third component, for aligning the liquid crystal molecules, and about 10 parts by weight or less for preventing poor display. A further preferred proportion is in the range of about 0.1 part by weight to about 2 parts by weight based thereon. A particularly preferred proportion is in the range of about 0.15 part by weight to about 0.8 part by weight based thereon. A most preferred proportion is in the range of about 0.3 part by weight to about 0.8 part by weigh based thereon.

A preferred proportion of the second component is about 10% by weight or more, based on the weight of the liquid crystal composition composed of the second component and the third component, for increasing the absolute value of dielectric anisotropy, and about 80% by weight or less for decreasing the minimum temperature. A further preferred proportion is in the range of about 15% by weight to about 70% by weight based thereon. A particularly preferred proportion is in the range of about 20% by weight to about 60% by weight based thereon.

A preferred proportion of the third component is about 20% by weight or more, based on the weight of the liquid crystal composition composed of the second component and the third component, for decreasing the viscosity or for increasing the maximum temperature, and about 90% by weight or less for increasing the absolute value of dielectric anisotropy. A further preferred proportion is in the range of about 30% by weight to about 80% by weight based thereon. A particularly preferred proportion is in the range of about 50% by weight to about 75% by weight based thereon.

Fourth, the preferred embodiment of the component compounds will be described. The liquid crystal composition of the invention contains as the first component the polymerizable monomer that has the capability of the hydrogen bond donor and can form the hydrogen bond with the alignment film surface, or the oligomer, the prepolymer or the polymer of the monomer. The hydrogen bond generally means attractive interaction with any other substance having an unshared pair of electrons (hydrogen bond acceptor) with coulomb force due to decreased electron density of hydrogen in the hydrogen bond donor in which hydrogen is covalently bonded with an atom having a large electronegativity, such as nitrogen, oxygen, halogen and sulfur. The hydrogen bond preferably has a bond energy of 5 kJ/mol or more for improving adhesion onto the alignment film surface. A further preferred hydrogen bond has a bond energy of 10 kJ/mol or more for improving rigidity of the polymer. The component may be a single compound or a mixture thereof. In order to improve compatibility with any other liquid crystal composition, the component is preferably a monomer or a low-molecular-weight oligomer.

More specifically, the first component is a monomer that has (a) one or more ring structures, (b) one or more polar groups and (c) one or more polymerizable groups in one molecule, an oligomer of the monomer, a prepolymer of the monomer or a polymer of the monomer. A case of a cyclic polar group is to contain (a) and (b). The ring structure is a generic term for a cyclic organic compound structure based on a carbon skeleton. The ring structure is not particularly limited, and specific examples include an isocyclic alicyclic ring structure such as adamantane, noradamantane, diamantane, triamantane, norbornene, norbornane, decahydronaphthalene, cyclobutane, cyclopentane, cyclohexane, cycloheptane, cyclobutene, cyclopentene, cyclohexene, cycloheptene, 1,3-cyclohexadiene, 1,4-cyclohexadiene and 1,5-cyclooctadiene, an isocyclic aromatic cyclic group such as benzene, naphthalene, pyrene and phenanthrene; and a heterocyclic cyclic group such as pyrrole, furan, pyridine, pyrrolidine, piperidine, piperazine, morpholine, dioxane, quinuclidine, tetrahydrofuran, aziridine, dithiane, pyrazole, triazole, imidazole, oxazole, thiazole, pyridone, quinolone, indole, benzotriazol, quinoline, isoquinoline, pyridazine, pyrimidine, pyrazine, thiadiazole, isoxazole, isothiazole, phthalan, coumaran, 1,2-methylenedioxybenzene, chroman and tetrahydropyran. The polar group means an atomic group having polarity, and if the group exists in the organic compound, the compound has the polarity. Specific examples include a group containing a hetero element, such as amino, carboxyl, hydroxyl, mercapto, amide and ester. The polymerizable group means a group suitable for a polymerization reaction such as free radical or ionic chain polymerization, polyaddition or polycondensation, or suitable for a polymer similarity reaction such as addition onto a polymer main chain or condensation thereon, and is well known to those skilled in the art. For example, a group containing a carbon-carbon double bond or a carbon-carbon triple bond for chain polymerization, and a group suitable for ring-opening polymerization for cyclic ether or the like are preferably used.

P described in formula (1) is a polymerizable group having 3 to 20 carbons and one or more groups selected from α, β-unsaturated ester or cyclic ether, in which at least one of hydrogen may be replaced by halogen. The α, β-unsaturated ester means ester in which a double bond exists between carbon in an α-position and carbon in a β-position. Specific examples of the α, β-unsaturated ester include formula (P-1), but are not limited thereto. Ether having a structure in which carbon on cyclic hydrocarbon is replaced by oxygen is referred to as cyclic ether. Specific examples of the cyclic ether include formulas (P-2) to (P-4), but are not limited thereto.

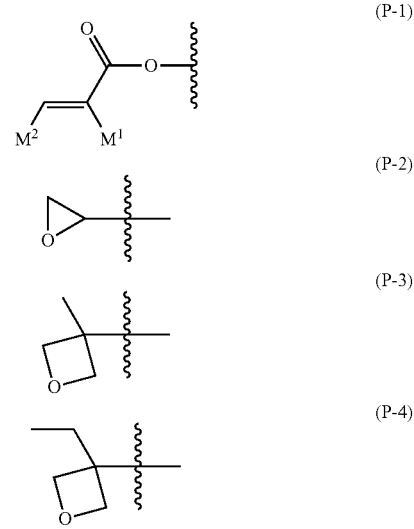

Preferred P is (P-1) for enhancing reactivity or for shortening the response time.

$M^1$ and $M^2$ are independently hydrogen, fluorine, methyl or trifluoromethyl. Preferred $M^1$ or $M^2$ is hydrogen or methyl for enhancing the reactivity. Further preferred $M^1$ is methyl and further preferred $M^2$ is hydrogen.

$X^1$ described in formula (1) is —H, —OH, —COOH, —NH$_2$, —NHR$^1$, —SH or a substituent derived from a heterocycle having 3 to 20 carbons and containing one or more of —NH—, and in the heterocycle, at least one of hydrogen may be replaced by halogen. The heterocycle means a ring in which an atom other than carbon is contained in ring-constituting atoms among the ring structures. Specific examples of the heterocycle include piperidine, piperazine, morpholine, quinuclidine, pyrrolidine, azetidine, oxetane, azetidine-2-one, aziridine, tropane, pyrrole, furan, thiophene, imidazole, pyrazole, oxazole, isoxazol, thiazole, isothiazole, pyridine, pyrimidine, pyridazine, pyrazine, 1,2,3-triazine, quinoline, isoquinoline, quinazoline, phthalazine, pteridine, coumarin, chromone, 1,4-benzodiazepine, indole, benzimidazole, benzofuran, purine, acridine, phenoxazine and phenothiazine. Preferred $X^1$ is —H, —OH, —COOH, —NH$_2$, —NHR$^1$, —SH and groups represented by formulas (X-1) to (X-13) for improving the adhesion onto the alignment film surface. Further preferred $X^1$ is —H, —OH, —COOH, —NH$_2$, —NHR$^1$, —SH and groups represented by formulas (X-1) to (X-3) for improving the compatibility with any other liquid crystal composition. $R^1$ is alkyl having 1 to 4 carbons. Preferred $R^1$ is alkyl having 1 or 2 carbons for improving the adhesion onto the alignment film surface.

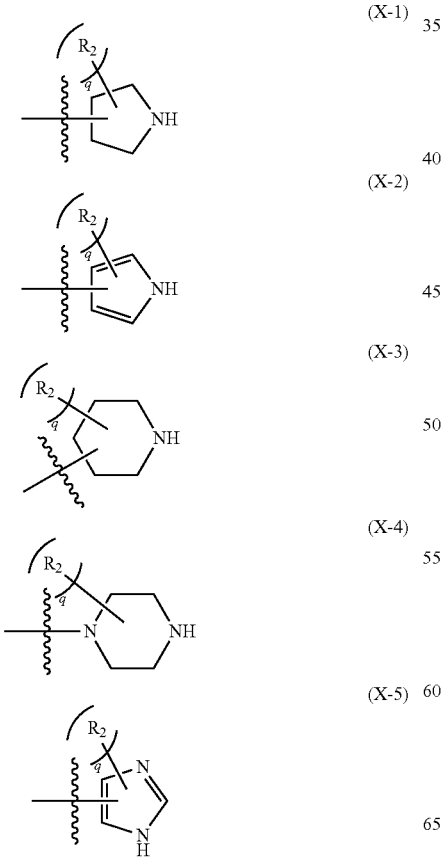

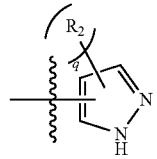

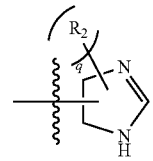

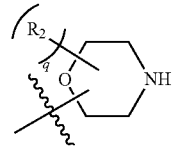

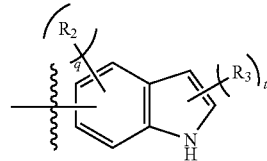

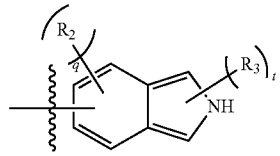

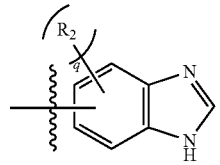

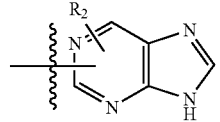

In which, in formulas (X-1) to (X-13), $R^2$ is halogen or alkyl having 1 to 4 carbons; $R^3$ is halogen or alkyl having 1 to 6 carbons; and when a plural pieces of $R^2$ and $R^3$ exist, respectively, the plural pieces may be identical or different, and a position subjected to replacement is arbitrary, and is not particularly restricted. Preferred $R^2$ is fluorine or alkyl having 1 carbon for enhancing the reactivity and the adhesion onto the alignment film surface; q is 0, 1, 2, 3 or 4; r is 0, 1, 2 or 3; and t is 0, 1 or 2. Preferred $R^3$ is fluorine or alkyl having 1 carbon for enhancing the reactivity and the adhesion onto the alignment film surface; and preferred q, r and t are 0 or 1 for enhancing the reactivity.

$X^2$ in formula (1-1) is —OH, —COOH, —NH$_2$, —NHR$^1$ and —SH. Preferred $X^2$ is —OH, —COOH, —NH$_2$ or —NHR$^1$ for improving long-term reliability of a panel. $R^1$ is alkyl having 1 to 4 carbons. Preferred $R^1$ is alkyl having 1 or 2 carbons for improving the adhesion onto the alignment film surface.

$X^3$ in formula (1-3) is a group represented by formulas (X-1) to (X-3). Preferred $X^3$ is a group represented by formula (X-1) or (X-3) for improving the compatibility with any other liquid crystal composition.

$Z^1$ and $Z^2$ in formula (1) are independently a single bond or alkylene having 1 to 10 carbons, in which at least one of —CH$_2$— may be replaced by —O—, —COO—, —OCO— or —OCOO—. Preferred $Z^1$ or $Z^2$ is a single bond or alkylene having 1 to 4 carbons for enhancing the reactivity. Further preferred $Z^1$ or $Z^2$ is a single bond or alkylene having 1 to 2 carbons.

$Z^3$ and $Z^4$ in formulas (1-1) and (1-3) are independently a single bond or alkylene having 1 to 4 carbons, and in the alkylene, at least one of —CH$_2$— may be replaced by —O—, —COO—, —OCO— or —OCOO—. Preferred $Z^1$ or $Z^2$ is a single bond, alkylene having 1 to 2 carbons or —OCH$_2$CH$_2$— for enhancing the reactivity.

$Z^5$ in formula (1-2) is alkylene having 1 to 4 carbons, and in the alkylene, one to two pieces of hydrogen are replaced by —OH or —COOH, and at least one of —CH$_2$— may be replaced by —O—, —COO—, —OCO— or —OCOO—. Preferred $Z^5$ is alkylene having 1 to 3 carbons for improving adsorbability with the alignment film surface, and in the alkylene, one piece of hydrogen is replaced by —OH or —COOH, and at least one of —CH$_2$— may be replaced by —O—, —COO—, —OCO— or —OCOO—.

A in formula (1) is a divalent group derived from adamantane, noradamantane, diamantane, triamantane, norbornene, norbornane, phthalan, coumaran, 1,2-methylenedioxybenzene, chroman, benzene, naphthalene, cyclohexane, cyclohexene, tetrahydropyran, dioxane, pyrimidine or pyridine, or a single bond, in which at least one of hydrogen may be replaced by halogen, alkyl having 1 to 12 carbons, or alkyl having 1 to 12 carbons in which at least one of hydrogen is replaced by halogen. B is a (n$^2$+m)-valent group derived from adamantane, noradamantane, diamantane, triamantane, norbornene, norbornane, phthalan, coumaran, 1,2-methylenedioxybenzene, chroman, benzene, naphthalene, cyclohexane, cyclohexene, tetrahydropyran, dioxane, pyrimidine or pyridine, or a single bond, in which at least one of hydrogen may be replaced by halogen, alkyl having 1 to 12 carbons, or alkyl having 1 to 12 carbons in which at least one of hydrogen is replaced by halogen. Moreover, (n$^2$+m) pieces of hydrogen are replaced in B.

A and B are preferably a group represented by formulas (Ri-1) to (Ri-7) each having a high rigidity for improving a pretilt angle-giving capability. Further, preferred A and B are a group represented by formulas (Ri-1) to (Ri-3) for improving the compatibility with any other liquid crystal composition.

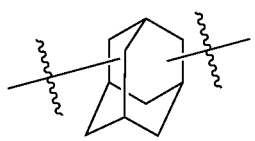
(Ri-1)

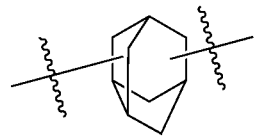
(Ri-2)

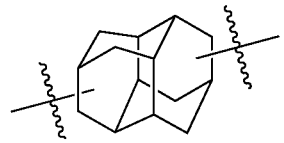
(Ri-3)

(Ri-4)

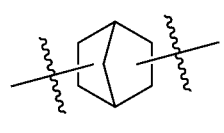
(Ri-5)

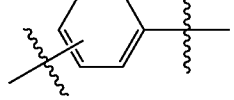
(Ri-6)

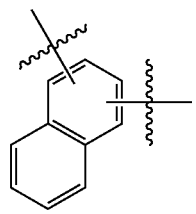
(Ri-7)

C and E in formula (2) are independently 1,4-cyclohexylene, 1,4-phenylene, 1,4-phenylene in which at least one of hydrogen is replaced by fluorine or chlorine, or tetrahydropyran-2,5-diyl, and when a is 2 or 3, two of arbitrary C may be identical or different. Preferred C or E is 1,4-cyclohexylene for decreasing the viscosity, and 1,4-phenylene for improving the optical anisotropy. Tetrahydropyran-2,5-diyl includes:

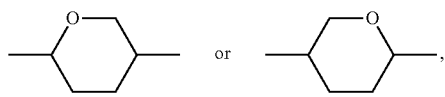

and preferably,

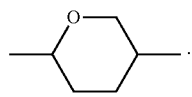

D in formula (2) is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl. Preferred D is 2,3-difluoro-1,4-phenylene for decreasing the viscosity, 2-chloro-3-fluoro-1,4-phenylene for decreasing the optical anisotropy, 7,8-difluorochroman-2,6-diyl for increasing the absolute value of dielectric anisotropy.

F, G and I in formula (3) are independently 1,4-cyclohexylene, 1,4-phenylene, 2-fluoro-1,4-phenylene or 3-fluoro-1,4-phenylene, and when c is 2, two of F may be identical or different. Preferred F, G or I is 1,4-cyclohexylene for decreasing the viscosity or increasing the maximum temperature, and 1,4-phenylene for decreasing the minimum temperature.

Then, m in formula (1) is 1, 2 or 3. Preferred m is 1 or 2 for increasing the voltage holding ratio.

Then, $n^1$ in formula (1) is 0, 1, 2, 3 or 4, and $n^2$ is 1, 2 or 3. Preferred $n^1$ is 0 or 1 for enhancing the reactivity. Preferred $n^2$ is 1 or 2 for improving the compatibility.

$L^1$ in formula (1) is a single bond or alkylene having 1 to 10 carbons, and in the alkylene, at least one of —$CH_2$— may be replaced by —O—, —COO—, —OCO— or —OCOO—, and at least one of —$CH_2$—$CH_2$— may be replaced by —CH=CH— or —C≡C—. Preferred $L^1$ is a single bond or alkylene having 1 to 4 carbons for enhancing the reactivity, and in the alkylene, at least one of —$CH_2$— may be replaced by —O—. Further preferred $L^1$ is a single bond.

$L^2$, $L^3$, $L^4$ and $L^5$ in formulas (2) and (3) are independently a single bond, ethylene, methyleneoxy or carbonyloxy, and when a is 2 or 3, two of arbitrary $L^2$ may be identical or different, and when c is 2, two of $L^4$ may be identical or different. Preferred $L^2$, $L^3$, $L^4$ or $L^5$ is a single bond for decreasing the viscosity, ethylene for decreasing the minimum temperature, and methyleneoxy for increasing the absolute value of dielectric anisotropy.

$R^4$ in formulas (1-1) and (1-2) is alkyl having 1 to 3 carbons. Preferred $R^4$ is alkyl having 1 or 2 carbons for enhancing the reactivity.

$R^5$ in formula (1-3-1) is alkyl having 1 to 3 carbons. Preferred $R^5$ is alkyl having 1 or 2 carbons for improving the adhesion onto the alignment film surface.

$R^6$ and $R^7$ are independently alkyl having 1 to 12 carbons, alkoxy having 1 to 12 carbons or alkenyl having 2 to 12 carbons, or alkenyl having 2 to 12 carbons in which at least one of hydrogen is replaced by fluorine. Preferred $R^6$ or $R^7$ is alkyl having 1 to 12 carbons for improving the stability to ultraviolet light or heat, and alkoxy having 1 to 12 carbons for decreasing the viscosity or increasing the absolute value of dielectric anisotropy.

$R^8$ and $R^9$ are independently alkyl having 1 to 12 carbons, alkoxy having 1 to 12 carbons or alkenyl having 2 to 12 carbons, or alkenyl having 2 to 12 carbons in which at least one of hydrogen is replaced by fluorine. Preferred $R^8$ or $R^9$ is alkenyl having 2 to 12 carbons for decreasing the viscosity, and alkyl having 1 to 12 carbons for improving the stability to ultraviolet light or for improving the stability to heat.

Preferred alkyl is methyl, ethyl, propyl, butyl, pentyl, hexyl, heptyl or octyl. Further preferred alkyl is ethyl, propyl, butyl, pentyl or heptyl for decreasing the viscosity.

Preferred alkoxy is methoxy, ethoxy, propoxy, butoxy, pentyloxy, hexyloxy or heptyloxy. Further preferred alkoxy is methoxy or ethoxy for decreasing the viscosity.

Preferred alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl or 5-hexenyl. Further preferred alkenyl is vinyl, 1-propenyl, 3-butenyl or 3-pentenyl for decreasing the viscosity. A preferred configuration of —CH=CH— in the alkenyl depends on a position of a double bond. Trans is preferred in alkenyl such as 1-propenyl, 1-butenyl, 1-pentenyl, 1-hexenyl, 3-pentenyl and 3-hexenyl for decreasing the viscosity, for instance. Cis is preferred in alkenyl such as 2-butenyl, 2-pentenyl and 2-hexenyl. In the alkenyl, straight-chain alkenyl is preferred to branched-chain alkenyl.

Preferred examples of alkenyl in which at least one of hydrogen is replaced by fluorine include 2,2-difluorovinyl, 3,3-difluoro-2-propenyl, 4,4-difluoro-3-butenyl, 5,5-difluoro-4-pentenyl and 6,6-difluoro-5-hexenyl. Further preferred examples include 2,2-difluorovinyl and 4,4-difluoro-3-butenyl for decreasing the viscosity.

Alkyl includes no cyclic alkyl. Alkoxy includes no cyclic alkoxy. Alkenyl includes no cyclic alkenyl. With regard to a configuration of 1,4-cyclohexylene, trans is preferred to cis for increasing the maximum temperature.

Then, a in formula (2) is 1, 2 or 3. Preferred a is 1 for decreasing the viscosity, and 2 or 3 for increasing the maximum temperature. Then, b in formula (2) is 0 or 1. Preferred b is 0 for decreasing the viscosity, and 1 for decreasing the minimum temperature. Then, c in formula (3) is 0, 1 or 2. Preferred c is 0 for decreasing the viscosity, and 1 or 2 for increasing the maximum temperature.

Cy in formulas (1-1) and (1-2) is a $w^2$-valent group derived from adamantane, benzene, naphthalene, norbornane or biphenyl. Preferred Cy is a group represented by formula (Ri-1) for improving the pretilt-giving characteristics or for improving the compatibility with any other liquid crystal composition.

Then, u in formula (1-1) is 1 or 2. Preferred u is 1 for increasing the voltage holding ratio. Then, v in formula (1-2) is 0, 1 or 2. Preferred v is 0 or 1 for enhancing the reactivity. Then, y in formula (1-3-1) is 0, 1, 2, 3 or 4. Preferred y is 0 or 1 for enhancing the reactivity.

Fifth, specific examples of the component compounds will be shown. In a preferred compound described below, $M^3$ is hydrogen or methyl. $X^4$ is —OH, —COOH or —$NH_2$. $Z^5$ is a single bond, alkylene having 1 to 2 carbons or —$OCH_2CH_2$—. $Z^7$ is alkylene having 1 to 3 carbons. $Z^8$ is alkylene having 1 to 3 carbons, and in the alkylene, one of hydrogen may be replaced by —OH or —COOH. $R^6$ and $R^9$ are independently straight-chain alkyl having 1 to 12 carbons, straight-chain alkoxy having 1 to 12 carbons or straight-chain alkenyl having 2 to 12 carbons. $R^7$ is straight-chain alkyl having 1 to 12 carbons or straight-chain alkoxy having 1 to 12 carbons. $R^8$ is straight-chain alkyl having 1 to 12 carbons or straight-chain alkenyl having 1 to 12 carbons. $R^{10}$ is fluorine or alkyl having 1 carbon. Then, d is 0, 1, 2, 3 or 4.

Preferred compound (1) includes compound (1-1-1) to compound (1-3-1). Further preferred compound (1) includes compound (1-1-1). Preferred compound (2) includes compound (2-1-1) to compound (2-19-1) Further preferred compound (2) includes compound (2-1-1) to compound (2-10-1), and compound (2-12-1) to compound (2-15-1). Particularly preferred compound (2) includes compound (2-1-1) to compound (2-8-1), compound (2-13-1) and compound (2-15-1). Preferred compound (3) includes compound (3-1-1) to compound (3-13-1). Further preferred compound (3) includes compound (3-1-1) to compound (3-8-1), compound (3-10-1) and compound (3-13-1). Particularly preferred compound (3) includes compound (3-1-1), compound (3-3-1), compound (3-5-1), compound (3-7-1) and compound (3-8-1).

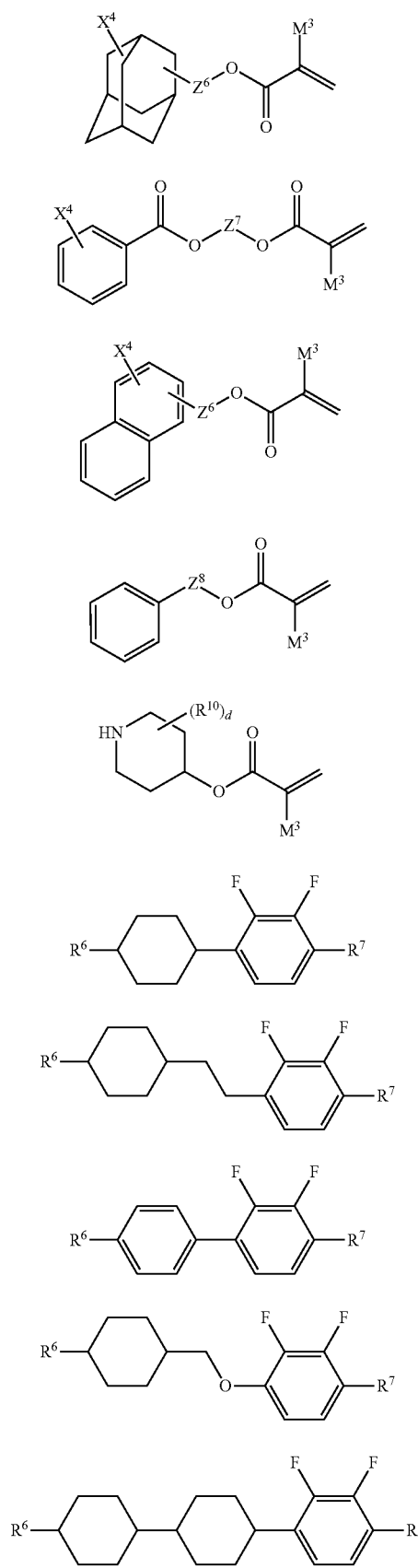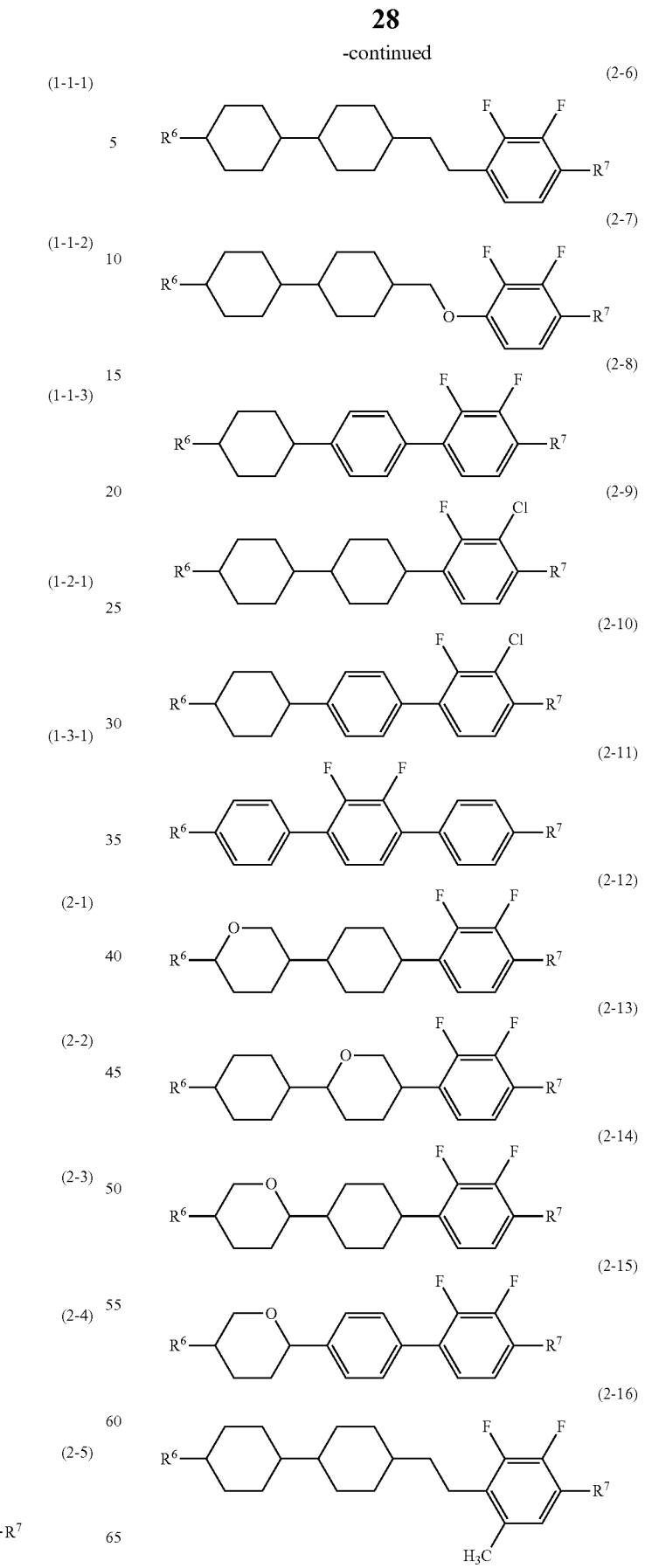

-continued (2-17)
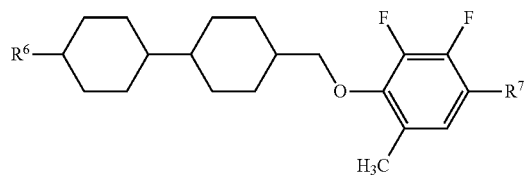

(2-18)
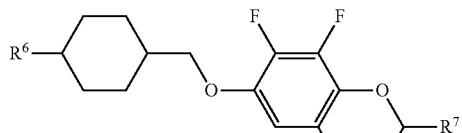

(2-19)
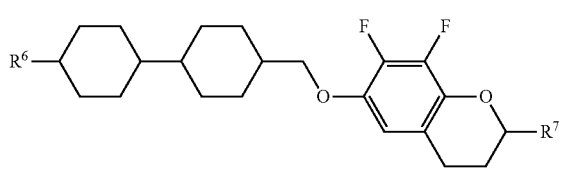

(3-1)
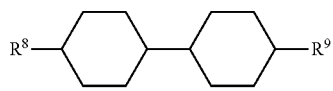

(3-2)
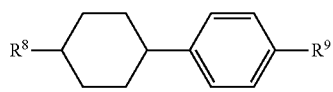

(3-3)
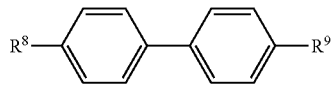

(3-4)
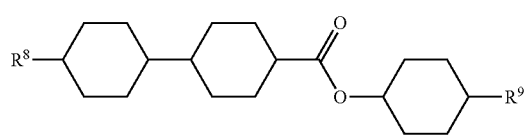

(3-5)

(3-6)
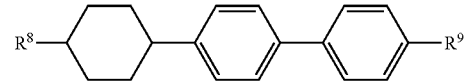

(3-7)
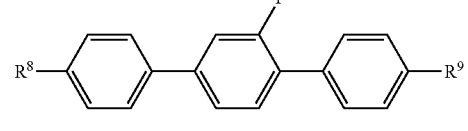

(3-8)
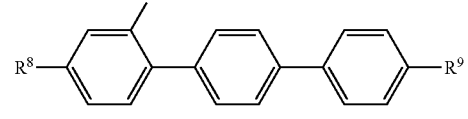

-continued (3-9)
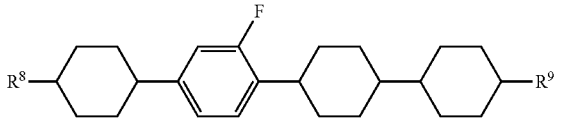

(3-10)
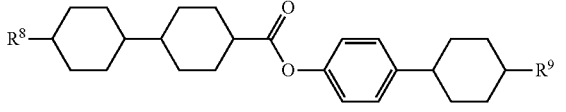

(3-11)
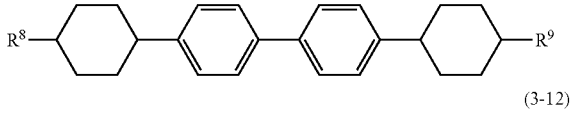

(3-12)
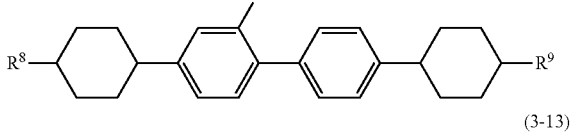

(3-13)
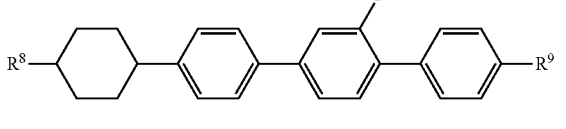

Sixth, the additive that may be mixed with the composition will be described. Specific examples of such an additive include a polymerizable compound other than compound (1), a polymerization initiator, a polymerization inhibitor, an optically active compound, an antioxidant, an ultraviolet light absorber, a light stabilizer, a heat stabilizer, an antifoaming agent and a dye.

The composition of the invention contains the polymerizable compound, and is therefore adapted to the polymer sustained alignment mode device. The composition may further contain a polymerizable compound different from compound (1) (namely, any other polymerizable compound). Preferred examples of the polymerizable compound include acrylate, methacrylate, a vinyl compound, a vinyloxy compound, propenyl ether, an epoxy compound (oxirane, oxetane) and vinyl ketone. Further preferred examples include an acrylate derivative or a methacrylate derivative.

Additional examples of the polymerizable compound that is other than compound (1) and may be further contained include compound (4-1) to compound (4-9).

(4-1)
$R^{11}-Z^9-$⟨(F)$_i$⟩-⟨(F)$_j$⟩$-Z^{10}-R^{12}$ (4-2)
$R^{11}-Z^9-$⟨(CH$_3$)$_i$⟩-⟨(CH$_3$)$_j$⟩$-Z^{10}-R^{12}$ (4-3)
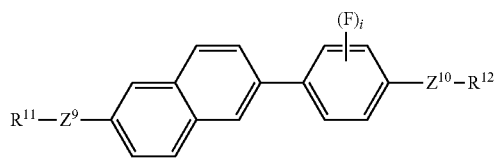

(4-4)
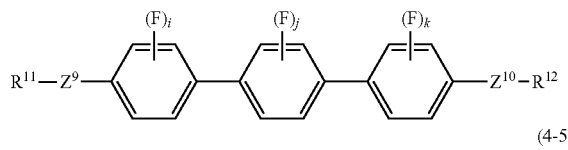

(4-5)
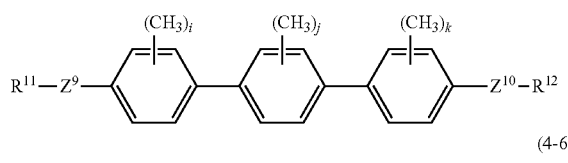

(4-6)
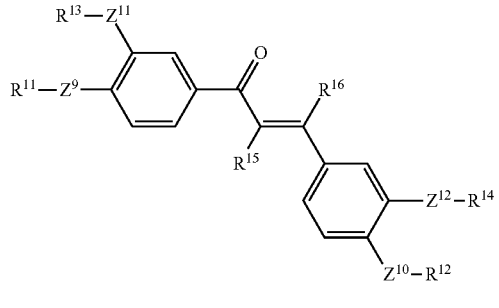

(4-7)
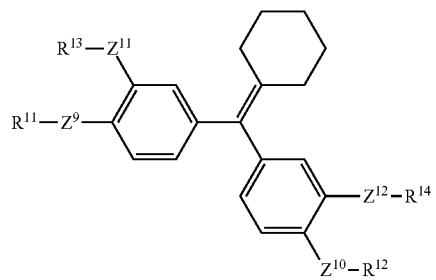

(4-8)
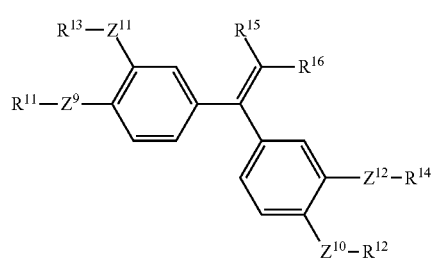

(4-9)
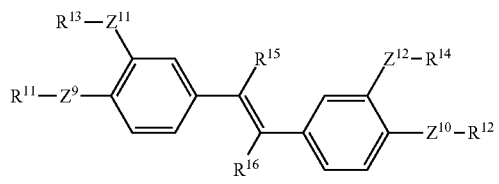

In compound (4-1) to compound (4-9), $R^{11}$, $R^{12}$, $R^{13}$ and $R^{14}$ are independently acryloyl or methacryloyl, and $R^{15}$ and $R^{16}$ are independently hydrogen, halogen or alkyl having 1 to 10 carbons; $Z^9$ and $Z^{10}$ are independently a single bond or alkylene having 1 to 12 carbons, and in the alkylene, at least one of —$CH_2$— may be replaced by —O—, at least one of —$CH_2$—$CH_2$— may be replaced by —CH═CH—, and at least one of $Z^9$ and $Z^{10}$ is a single bond or —O—; $Z^{11}$ and $Z^{12}$ are independently a single bond or alkylene having 1 to 12 carbons, and in the alkylene, at least one of —$CH_2$— may be replaced by —O—; and i, j and k are independently 0, 1 or 2, and in compound (4-1), a sum of i and j is 1 or more, and in compound (4-4), a sum of i, j and k is 1 or more.

When the total weight of the liquid crystal composition is taken as 100 parts by weight, a preferred proportion of the polymerizable compound is about 0.03 part by weight or more for achieving the effect thereof, and about 10 parts by weight or less for preventing the poor display. A further preferred proportion is in the range of about 0.1 part by weight to about 2 parts by weight. In the polymerizable compound, compound (1) has a high solubility in the liquid crystal composition, and a high reactivity. In the polymerizable compound, a preferred proportion of compound (1) is 10 parts by weight or more. A further preferred proportion is 50 parts by weight or more. A particularly preferred proportion is 80 parts by weight or more. A further particularly preferred proportion is 100 parts by weight.

The polymerizable compound is preferably polymerized by irradiation with ultraviolet light or the like in the presence of a suitable initiator such as a photopolymerization initiator. Suitable conditions for polymerization, suitable types of the initiator and suitable amounts thereof are known to those skilled in the art, and are described in literature. For example, Irgacure 651 (trade name; BASF), Irgacure 184 (trade name; BASF) or Darocur 1173 (trade name; BASF), each being a photoinitiator, is suitable for radical polymerization. A preferred proportion of the photopolymerization initiator is in the range of about 0.1% by weight to about 5% by weight based on the polymerizable compound, and a further preferred proportion is in the range of about 1% by weight to about 3% by weight. A polymerized compound may be arranged through a process of arranging the liquid crystal composition containing the polymerizable compound between two substrates in the liquid crystal display device and polymerizing the polymerizable compound while applying a voltage between opposing electrode layers on the substrates, or a liquid crystal composition containing a preliminarily polymerized compound may be arranged between the two substrates in the liquid crystal display device.

Examples of the polymerization inhibitor include hydroquinone, a hydroquinone derivative such as methylhydroquinone, 4-tert-butylcatechol, 4-methoxyphenol and phenothiazine.

The optically active compound is effective in inducing a helical structure in liquid crystal molecules to give a required twist angle, thereby being effective in preventing a reverse twist. A helical pitch can be adjusted by adding the optically active compound. Two or more optically active compounds may be added for the purpose of adjusting temperature dependence of the helical pitch. Preferred examples of the optically active compound include compound (Op-1) to compound (Op-18) as described below. In compound (Op-18), J is 1,4-cyclohexylene or 1,4-phenylene, and $R^{24}$ is alkyl having 1 to 10 carbons. A preferred proportion of the optically active compound is about 5% by weight or less. A further preferred proportion is in the range of about 0.01% by weight to about 2% by weight.

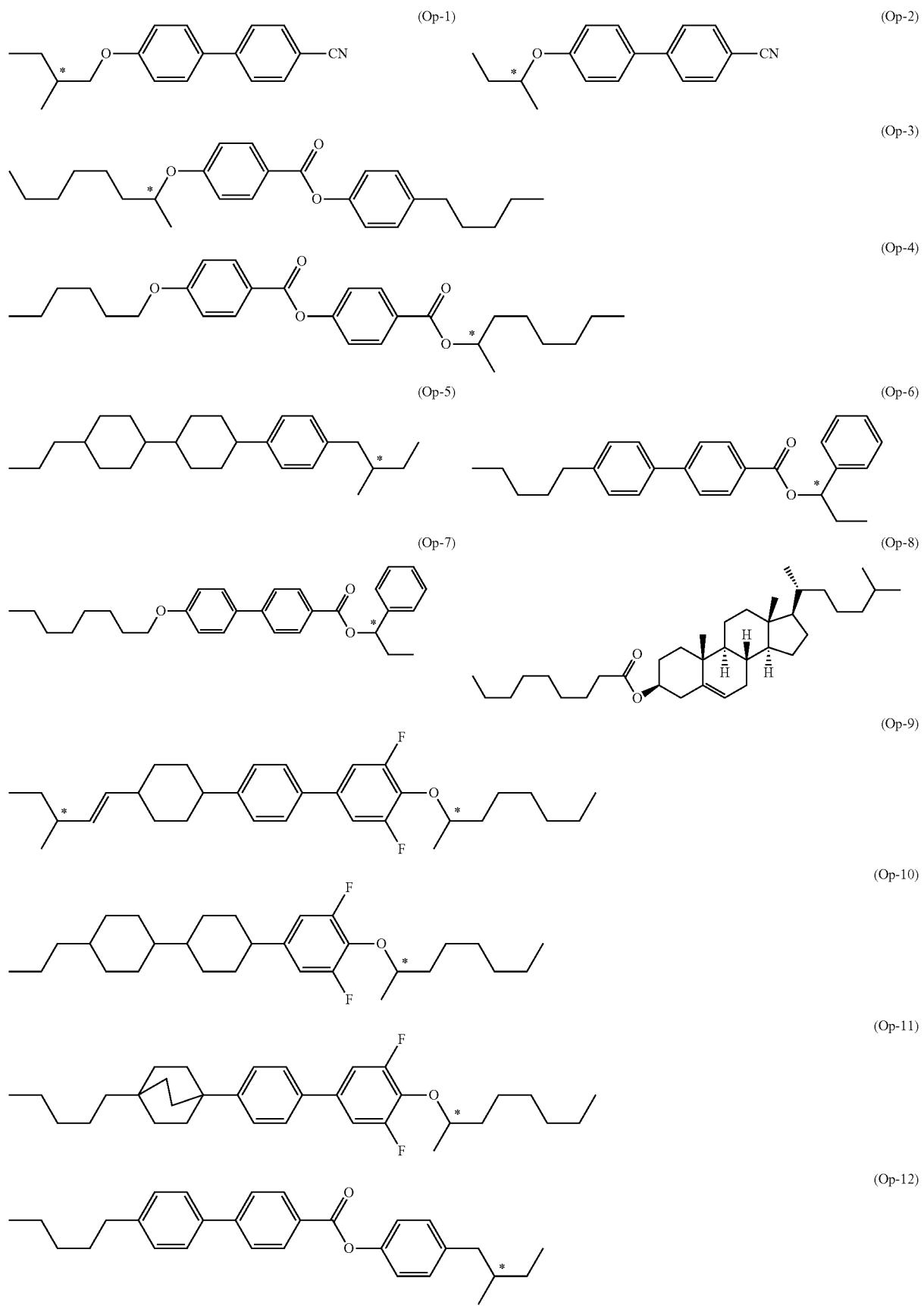

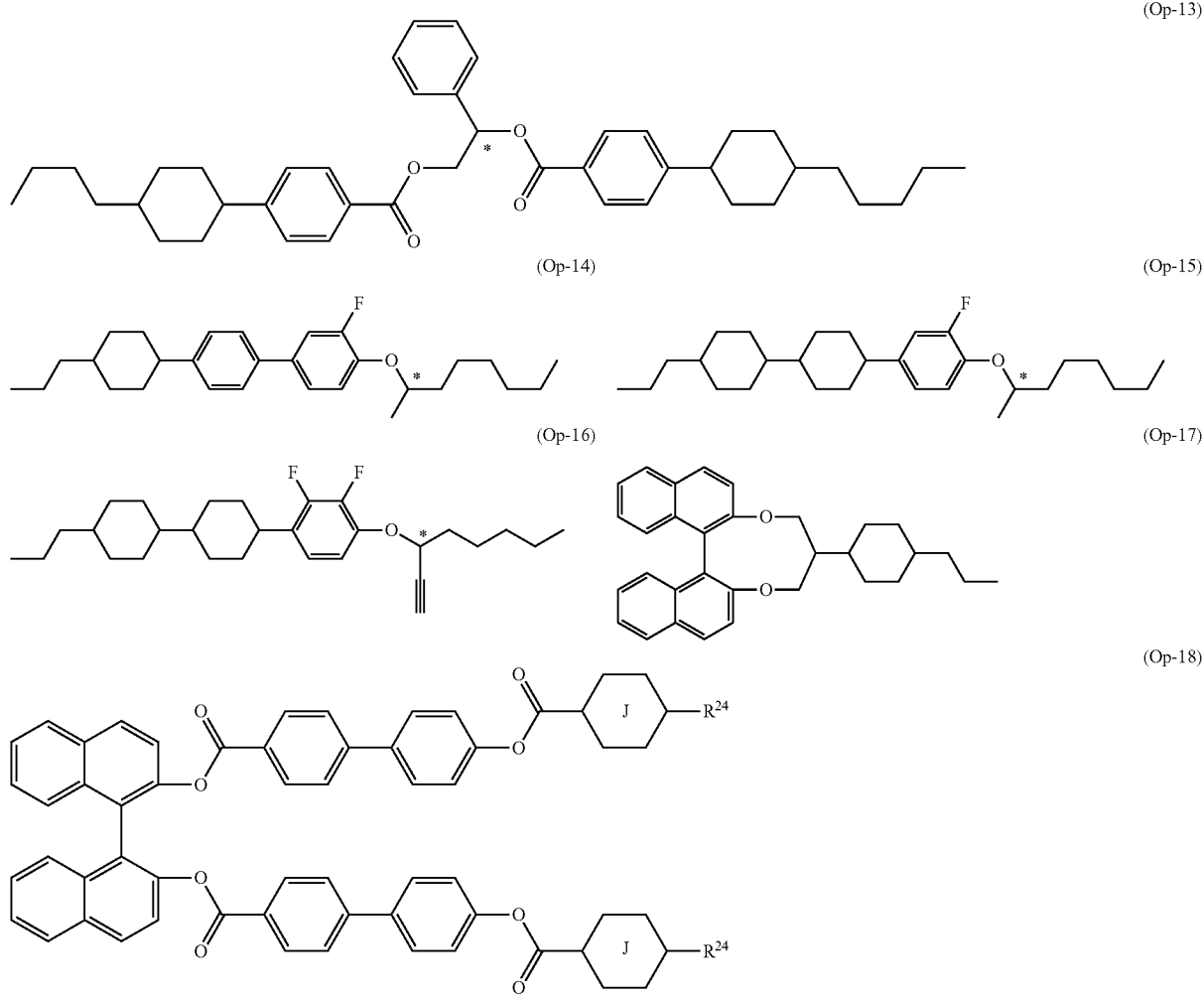

The antioxidant is effective for maintaining the large voltage holding ratio. Preferred examples of the antioxidant include compounds (AO-1) and (AO-2) described below; IRGANOX 415, IRGANOX 565, IRGANOX 1010, IRGANOX 1035, IRGANOX 3114 and IRGANOX 1098 (trade names; BASF). When $R^{25}$ is —CH$_3$ in compound (AO-1), compound (AO-1) is effective in preventing a decrease in specific resistance caused by heating in air because the compound (AO-1) has a large volatility. When $R^{25}$ is —C$_7$H$_{15}$, compound (AO-1) is effective in maintaining the large voltage holding ratio at room temperature and also at a temperature close to the maximum temperature of the nematic phase after the device has been used for a long period of time because such compound (AO-1) has a small volatility. A preferred proportion of the antioxidant is about 50 ppm or more for achieving the effect thereof, and about 600 ppm or less for avoiding a decrease in the maximum temperature or avoiding an increase in the minimum temperature. A further preferred proportion is in the range of about 100 ppm to about 300 ppm.

The ultraviolet light absorber is effective in preventing a decrease of the maximum temperature. Preferred examples of the ultraviolet light absorber include a benzophenone derivative, a benzoate derivative and a triazole derivative. Specific examples includes compounds (AO-3) and (AO-4) described below; TINUVIN 329, TINUVIN P, TINUVIN 326, TINUVIN 234, TINUVIN 213, TINUVIN 400, TINUVIN 328 and TINUVIN 99-2 (trade names; BASF); and 1,4-diazabicyclo[2.2.2]octane (DABCO). The light stabilizer such as an amine having steric hindrance is preferred for maintaining the large voltage holding ratio. Preferred examples of the light stabilizer include compounds (AO-5) and (AO-6) described below; and TINUVIN 144, TINUVIN 765 and TINUVIN 770DF (trade names: BASF). A preferred proportion of the absorber or the stabilizer is about 50 ppm or more for achieving the effect thereof, and about 10,000 ppm or less for avoiding a decrease in the maximum temperature or avoiding an increase in the minimum temperature. A further preferred proportion is in the range of about 100 ppm to about 10,000 ppm.

The heat stabilizer is also effective for maintaining the large voltage holding ratio, and preferred examples include IRGAFOS 168 (trade name: BASF). The antifoaming agent is effective in preventing foam formation. Preferred examples of the antifoaming agent include dimethyl silicone oil and methylphenyl silicone oil. A preferred proportion of the antifoaming agent is about 1 ppm or more for achieving the effect thereof, and about 1,000 ppm or less for preventing the poor display. A further preferred proportion is in the range of about 1 ppm to about 500 ppm.

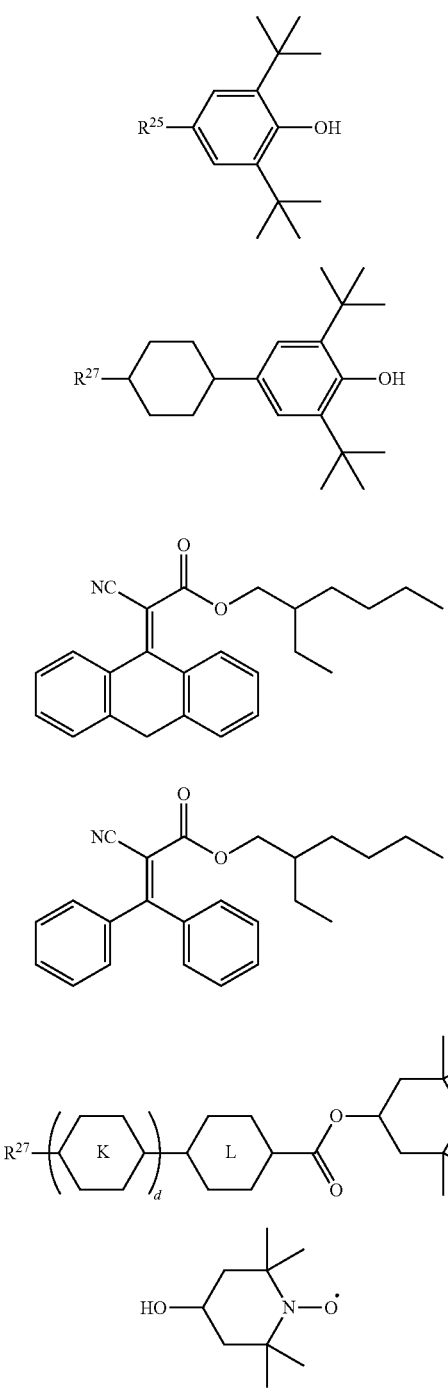

(AO-1)
(AO-2)
(AO-3)
(AO-4)
(AO-5)
(AO-6)

In compound (AO-1), $R^{25}$ is alkyl having 1 to 20 carbons, alkoxy having 1 to 20 carbons, —COOR$^{26}$ or —CH$_2$CH$_2$COOR$^{26}$; and $R^{26}$ is alkyl having 1 to 20 carbons. In compounds (AO-2) and (AO-5), $R^{27}$ is alkyl having 1 to 20 carbons. In compound (AO-5), K and L are independently 1,4-cyclohexylene or 1,4-phenylene; d is 0, 1 or 2; and $R^{28}$ is hydrogen, methyl or O. (oxygen radical).

A dichroic dye such as an azo dye or an anthraquinone dye is mixed with the composition to be adapted to a device having a guest host (GH) mode. A preferred proportion of the dye is in the range of about 0.01% by weight to about 10% by weight.

Seventh, the methods for synthesizing the component compounds will be described. The compounds can be prepared according to known methods. Examples of synthetic methods will be shown. A commercial item is used as compound (1). Specific examples of commercial items of compound (1-3-1) include "DIAPURESTE HADA and HADM made by Mitsubishi Gas Chemical Co., Inc." as a commercial item of compound (1-1-1), "ARONIX M-5400 made by Toagosei Co., Ltd." as a commercial item of compound (1-1-2), "Mc-HN made by Kawasaki Kasei Chemicals Ltd." as a commercial item of compound (1-1-3), "ARONIX M-5700 made by Toagosei Co., Ltd." as a commercial item of compound (1-2-1) and "2,2,6,6-Tetramethyl-4-piperidyl methacrylate made by Tokyo Chemical Industry Co., Ltd." Compound (2-1) and compound (2-5) are prepared by the method described in JP H2-503441 A. Compound (3-1) and compound (3-5) are prepared by the method described in JP S59-176221 A. Compound (4) is prepared by the method described in JP 2012-001526 A. In addition, compound (5) is used in Comparative Examples of the invention. Compound (5) has no polar group having the capability of the hydrogen bond donor, being the features of the invention, and therefore neither a high polymerization reactivity nor a good pretilt-providing capability is wanted. As compounds (5-1) and (5-4) described below, commercial items made by Tokyo Chemical Industry Co., Ltd. are used, compound (5-2), a commercial item made by Sigma-Aldrich Co. LLC. is used, and as compound (5-3), a commercial item made by Kyoeisha Chemical Co., Ltd. is used.

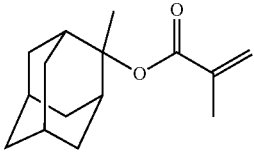

(5-1)

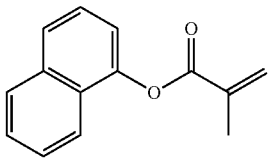

(5-2)

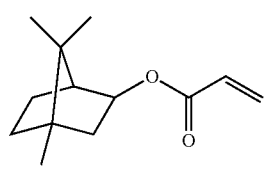

(5-3)

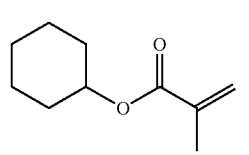

(5-4)

Any compounds whose synthetic methods are not described above can be prepared according to the methods described in books such as Organic Syntheses (John Wiley & Sons, Inc.), Organic Reactions (John Wiley & Sons, Inc.), Comprehensive Organic Synthesis (Pergamon Press) and New Experimental Chemistry Course (Shin Jikken Kagaku Koza in Japanese) (Maruzen Co., Ltd.). The composition is prepared according to a publicly known method using the thus obtained compounds. For example, the component compounds are mixed and dissolved in each other by heating.

Last, the application of the composition will be described. Most of the compositions have a minimum temperature of about −10° C. or lower, a maximum temperature of about 70° C. or higher, and an optical anisotropy in the range of about 0.07 to about 0.20. The device including the composition has a large voltage holding ratio. The composition is suitable for use in the AM device. The composition is particularly suitable for use in a transmissive AM device. A composition having an optical anisotropy in the range of about 0.08 to about 0.25 may be prepared by controlling the ratio of the component compounds or by mixing any other liquid crystal compound. The composition can be used as the composition having the nematic phase and as the optically active composition by adding the optically active compound.

The composition can be used for the AM device. Further, the composition can also be used for a PM device. The composition can be used for an AM device and a PM device having a mode such as PC, TN, STN, ECB, OCB, IPS, VA, PSA and a-PSA. Use for the AM device having a polymer sustained alignment mode such as the a-PSA mode and the PSA mode is particularly preferred. The devices may be of a reflective type, a transmissive type or a transflective type. Use for the transmissive device is preferred. The composition can also be used for an amorphous silicon-TFT device or a polycrystal silicon-TFT device. The composition can also be used for a nematic curvilinear aligned phase (NCAP) device prepared by microencapsulating the composition, or for a polymer dispersed (PD) device in which a three-dimensional network-polymer is formed in the composition.

One example of the method for manufacturing the liquid crystal display device is as described below. A device having two substrates referred to as an array substrate and a color filter substrate is arranged. At least one of the substrates has an electrode layer. Meanwhile, a liquid crystal composition is prepared by mixing the liquid crystal compounds. Compound (1) is added to the composition. The additive may be added thereto when necessary. The liquid crystal composition (or liquid crystal material) is injected into the device. The device is irradiated with light in a state in which voltage is applied to the device. In the case of compound (1), ultraviolet light is preferred. Compound (1) is polymerized by irradiation with light. A liquid crystal composition containing a polymer is formed by the polymerization. A polymer sustained alignment mode liquid crystal display device is manufactured according to such a procedure.

In the procedure, when voltage is applied, liquid crystal molecules are aligned due to action of an electric field. Molecules of compound (1) are also aligned according to the alignment. Compound (1) is polymerized with ultraviolet light in the state described above, and thus a polymer in which the alignment is maintained is formed. A response time of the device is shortened due to an effect of the polymer. Image persistence is caused by a poor operation of the liquid crystal molecules, and thus the persistence is also to be improved simultaneously due to the effect of the polymer.

EXAMPLES

The invention will be described in detail by way of Examples below, but the invention is not limited by the Examples. The invention includes a mixture of an LC-A composition and an LC-B composition. The invention also includes a mixture in which at least two compositions in Examples were mixed. A compound prepared was identified according to proton nuclear magnetic resonance spectroscopy ($^1$H-NMR) or the like. A melting point of the compound was determined by differential scanning calorimetry (DSC). First, analytical methods will be described.

$^1$H-NMR analysis: DRX-500 made by Bruker BioSpin Corporation was used for measurement. A sample was dissolved in a deuterated solvent such as $CDCl_3$, and measurement was carried out under conditions of room temperature, 500 MHz, 24 times of accumulation and so forth. Tetramethylsilane was used as an internal standard. In explanation of NMR spectra, s, d, t, q and m stand for a singlet, a doublet, a triplet, a quartet and a multiplet, respectively.

HPLC analysis: Prominence (LC-20AD; SPD-20A) made by Shimadzu Corporation was used for measurement. As a column, YMC-Pack ODS-A (length 150 mm, bore 4.6 mm, particle diameter 5 μm) made by YMC Co., Ltd. was used. As an eluate, acetonitrile/water (volume ratio: 80/20) was used, and a flow rate was adjusted to 1 mL/min. As a detector, a UV detector, an RI detector and a CORONA detector or the like was appropriately used. When the UV detector was used, a detection wavelength was adjusted to 254 nanometers. A sample was dissolved in acetonitrile, and 1 microliter of the resulting solution (0.1% by weight) was introduced into a sample chamber. As a recorder, C-R7Aplus made by Shimadzu Corporation was used. The resulting chromatogram showed a peak retention time and a peak area corresponding to each of the component compounds.

A ratio of the peak areas in the chromatogram obtained from HPLC relates to a ratio of the component compounds. In general, weight percent and the number of parts by weight of the component compounds are not identical with area % of the component compounds. However, when the column described above is used, the weight percent and the number of parts by weight of the component compounds may be calculated from the area % of the peak. In the invention, the reason is that no significant difference exists between correction coefficients of the component compounds.

Gas chromatographic analysis: GC-14B Gas Chromatograph made by Shimadzu Corporation was used for measurement. A carrier gas was helium (2 mL/min). A sample injector and a detector (FID) were set to 280° C. and 300° C., respectively. A capillary column DB-1 (length 30 m, bore 0.32 mm, film thickness 0.25 μm; dimethylpolysiloxane as a stationary phase, non-polar) made by Agilent Technologies, Inc. was used for separation of component compounds. After a column was kept at 200° C. for 2 minutes, the column was heated to 280° C. at a rate of 5° C./min. A sample was dissolved in acetone, and 1 microliter of the resulting solution (0.1% by weight) was injected into the sample injector. A recorder was C-R5A Chromatopac made by Shimadzu Corporation or the equivalent thereof. The resulting gas chromatogram showed a peak retention time and a peak area corresponding to each of the component compounds.

As a solvent for diluting the sample, chloroform, hexane or the like may also be used. The following capillary columns may also be used for separating the component compounds: HP-1 (length 30 m, bore 0.32 mm, film thickness 0.25 μm) made by Agilent Technologies, Inc., Rtx-1 (length 30 m, bore 0.32 mm, film thickness 0.25 μm) made by Restek Corporation and BP-1 (length 30 m, bore 0.32 mm, film thickness 0.25 μm) made by SGE International Pty. Ltd. A capillary column CBP1-M50-025 (length 50 m, bore 0.25 mm, film thickness 0.25 μm) made by Shimadzu Corporation may also be used for the purpose of preventing an overlap of peaks of the compounds.

A proportion of liquid crystal compounds contained in the composition is calculated by the method as described below. The liquid crystal compounds can be detected by the gas chromatograph. A ratio of the peak areas in the gas chromatogram corresponds to a proportion of the liquid crystal compounds (mole ratio). When the capillary column described above was used, a correction coefficient of each of the liquid crystal compounds may be regarded as 1 (one). Accordingly, a proportion of the liquid crystal compounds (weight percent) can be calculated from the ratio of the peak areas by applying correction using the mole ratio.

Ultraviolet-visible spectrophotometry: PharmaSpec UV-1700 made by Shimadzu Corporation was used for measurement. A detection wavelength was adjusted in the range of 190 nanometers to 700 nanometers. A sample was dissolved in acetonitrile to prepare a solution of 0.01 mmol/L, and measurement was carried out by putting the resulting solution in a quartz cell (optical path length: 1 cm).

DSC measurement: DSC-7 system or Diamond DSC System being a scanning calorimeter made by PerkinElmer, Inc. was used for measurement. A sample was heated and then cooled at a rate of 3° C./min. A starting point of an endothermic peak or an exothermic peak caused by a phase change of the sample was determined by extrapolation, and thus a melting point was determined.

Compatibility of polymerizable compound and any other liquid crystal composition: A state of a liquid crystal phase after a polymerizable liquid crystal composition was left to stand for seven days in a constant-temperature bath at a predetermined temperature was visually observed.

Sample for measurement: When characteristics of a composition, such as a maximum temperature, viscosity and optical anisotropy were measured, the composition was used as a sample as it was. When characteristics of a compound were measured, a sample for measurement was prepared by mixing the compound (15% by weight) with a base liquid crystal (85% by weight). Values of characteristics of the compound were calculated using values obtained by measurement, according to an extrapolation method: (extrapolated value)={(measured value of a sample for measurement)−0.85×(measured value of a base liquid crystal)}/0.15. When a smectic phase (or crystals) precipitated at a ratio thereof at 25° C., a ratio of the compound to the base liquid crystal was changed step by step in the order of (10% by weight:90% by weight), (5% by weight:95% by weight) and (1% by weight:99% by weight). Values of maximum temperature, viscosity, optical anisotropy and dielectric anisotropy with regard to the compound were determined according to the extrapolation method.

Components of the base liquid crystals and ratios thereof were as described below.

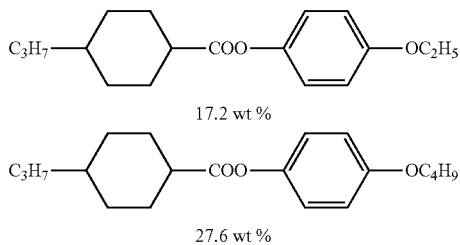

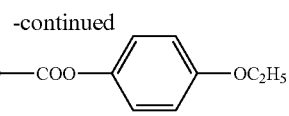

-continued

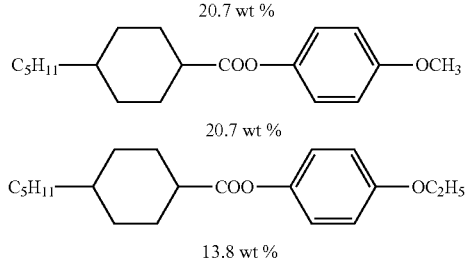

Characteristics were measured according to methods described below. Some of the methods are applied as described in the Standard of Japan Electronics and Information Technology Industries Association (hereinafter, abbreviated as JEITA) discussed and established in JEITA (JEITA ED-2521B), or as modified thereon.

(1) Maximum temperature of nematic phase (NI; ° C.): A sample was placed on a hot plate in a melting point apparatus equipped with a polarizing microscope and was heated at a rate of 1° C./min. Temperature when part of the sample began to change from a nematic phase to an isotropic liquid was measured. A maximum temperature of the nematic phase may be occasionally abbreviated as "maximum temperature."

(2) Optical anisotropy (refractive index anisotropy; Δn; measured at 25° C.): Measurement was carried out by an Abbe refractometer with a polarizing plate mounted on an ocular, using light at a wavelength of 589 nanometers. A surface of a main prism was rubbed in one direction, and then a sample was added dropwise onto the main prism. A refractive index (n∥) was measured when a direction of polarized light was parallel to a direction of rubbing. A refractive index (n⊥) was measured when a direction of polarized light was perpendicular to a direction of rubbing. A value of optical anisotropy was calculated from an equation: Δn=n∥−n⊥.

(3) Dielectric anisotropy (Δε; measured at 25° C.): A value of dielectric anisotropy was calculated from an equation: Δε=ε∥−ε⊥. A dielectric constant (ε∥ and ε⊥) was measured as described below:

(1) Measurement of dielectric constant (ε∥): An ethanol (20 mL) solution of octadecyltriethoxysilane (0.16 mL) was applied to a well-cleaned glass substrate. The glass substrate was rotated with a spinner, and then heated at 150° C. for 1 hour. A sample was put in a VA device in which a distance between two glass substrates (cell gap) was 4 μm, and the device was sealed with an ultraviolet-curable adhesive. Sine waves (0.5 V, 1 kHz) were applied to the device, and after 2 seconds, a dielectric constant of liquid crystal molecules in a major axis direction (ε∥) was measured.

(2) Measurement of dielectric constant (ε⊥): A polyimide solution was applied to a well-cleaned glass substrate. After calcining the glass substrate, rubbing treatment was applied to an alignment film obtained. A sample was put in a TN device in which a distance between two glass substrates (cell gap) was 9 μm and a twist angle was 80 degrees. Sine waves (0.5 V, 1 kHz) were applied to the device, and after 2 seconds, a dielectric constant of the liquid crystal molecules in a minor axis direction (ε⊥) was measured.

(4) Residual monomer concentration (ReM; parts by weight): A sample was prepared by adding 0.3 part by weight of a polymerizable compound to and 100 parts by weight of a liquid crystal composition, and dissolved thereinto. The sample was then injected into a cell with ITO to which a polyimide alignment film to induce vertical alignment was applied at a cell gap of 3.5 μm. The cell was irradiated with ultraviolet light having 80 mW/cm$^2$ for 375 seconds while a voltage of 15 V was applied thereto. Eye Ultraviolet Curing System made by EYE GRAPHICS CO., LTD. was used for irradiation with ultraviolet light. Then, a residual monomer concentration was measured according to HPLC.

(5) Pretilt angle (Pt;)°: A sample was prepared by adding 0.3 part by weight of a polymerizable compound to 100 parts by weight of a liquid crystal composition and dissolved thereinto. The sample was injected into a cell with ITO to which a polyimide alignment film to induce vertical alignment was applied at a cell gap of 3.5 μm. A pretilt angle of the cell (crystal rotation method) was measured, and then the cell was irradiated with ultraviolet light having 80 mW/cm$^2$ for 375 seconds while a voltage of 15 V was applied thereto. Eye Ultraviolet Curing System made by EYE GRAPHICS CO., LTD. was used for irradiation with ultraviolet light. Then, the pretilt angle of the cell was measured. Here, a large value (namely, the value significantly deviated from 0°) means a large pretilt angle.

The compounds in Comparative Examples and Examples were described using symbols according to definitions in Table 3 described below. In Table 3, a configuration of 1,4-cyclohexylene is trans. A parenthesized number next to a symbolized compound in Examples corresponds to the number of the compound. A symbol (-) means any other liquid crystal compound. A proportion (percentage) of the liquid crystal compound is expressed in terms of weight percent (% by weight) based on the weight of the liquid crystal composition constituted of a second component and a third component excluding a first component. A proportion (part) of the polymerizable compound is expressed in terms of the number of parts by weight (parts by weight) based on a total weight of the liquid crystal composition constituted of the second component and the third component excluding the first component. The liquid crystal composition further contains impurities. Values of characteristics of the composition were summarized in a last part.

TABLE 3

Method for Description of Compounds using Symbols
R-(A$_1$)-Z$_1$- . . . -Z$_n$-(A$_n$)-R'

| 1) Left-terminal Group R— | Symbol |
|---|---|
| C$_n$H$_{2n+1}$— | n- |
| C$_n$H$_{2n+1}$O— | nO— |
| C$_m$H$_{2m+1}$OC$_n$H$_{2n}$— | mOn- |
| CH$_2$=CH— | V— |
| C$_n$H$_{2n+1}$—CH=CH— | nV— |
| CH$_2$=CH—C$_n$H$_{2n}$— | Vn- |
| C$_m$H$_{2m+1}$—CH=CH—C$_n$H$_{2n}$— | mVn- |
| CF$_2$=CH— | VFF— |
| CF$_2$=CH—C$_n$H$_{2n}$— | VFFn- |
| CH$_2$=CHCOO— | AC— |
| CH$_2$=C(CH$_3$)COO— | MAC— |
| CH$_2$=CHOCOO— | VCA— |
| CH$_2$=CHCH$_2$OCOO— | ACA— |
| (epoxide structure) | Ep- |
| (oxetane structure with H$_{2n+1}$C$_n$) | Oxn- |

TABLE 3-continued

Method for Description of Compounds using Symbols
R-(A$_1$)-Z$_1$- . . . -Z$_n$-(A$_n$)-R'

| 2) Right-terminal Group —F | Symbol |
|---|---|
| —C$_n$H$_{2n+1}$ | -n |
| —OC$_n$H$_{2n+1}$ | —On |
| —CH=CH$_2$ | —V |
| —CH=CH—C$_n$H$_{2n+1}$ | —Vn |
| —C$_n$H$_{2n}$—CH=CH$_2$ | -nV |
| —CH=CF$_2$ | —VFF |
| —COOCH$_3$ | -EMe |
| —OCOCH=CH$_2$ | —AC |
| —OCOC(CH$_3$)=CH$_2$ | —MAC |
| (epoxide structure) | -Ep |
| (oxetane structure with C$_n$H$_{2n+1}$) | -Oxn |

| 3) Bonding Group -Zn- | Symbol |
|---|---|
| —C$_n$H$_{2n+1}$— | n |
| —COO— | E |
| —CH=CH—O— | VO |
| —O—CH=CH— | OV |
| —CH=CH— | V |
| —CF$_2$O— | X |
| —OCH$_2$— | O1 |
| —CH$_2$O— | 1O |
| —O— | O |

| 4) Ring Strucutre -An- | Symbol |
|---|---|
| (cyclohexylene) | H |
| (pyran with O top) | Dh |
| (pyran with O top-right) | dh |
| (phenylene) | B |
| (fluorophenylene) | B(F) |

TABLE 3-continued

Method for Description of Compounds using Symbols
R-(A₁)-Z₁- . . . -Zₙ-(Aₙ)-R'

| Structure | Symbol |
|---|---|
| 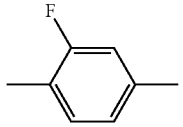 | B(2F) |
| 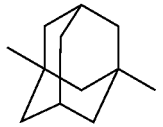 | Ad |
| 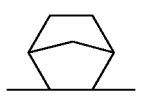 | Nb |
| 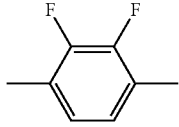 | B(2F,3F) |
| 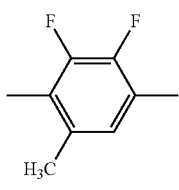 | B(2F,3F,6Me) |
| 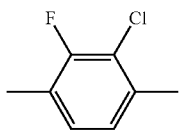 | B(2F,3CL) |
| 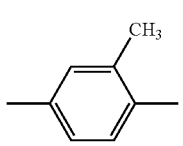 | B(Me) |
| 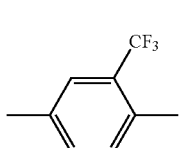 | B(CF3) |
| 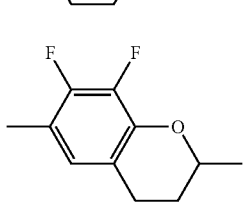 | Cro(7F,8F) |
| 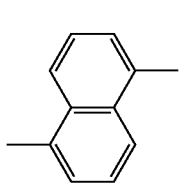 | Np(1,5) |
| 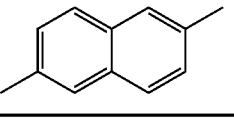 | Np(2,6) |

5) Examples of Description

Example 1. 3-HB(2F,3R)—O2

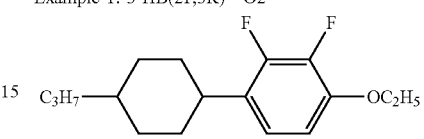

Example 2. 3-HDhB(2F,3F)—O2

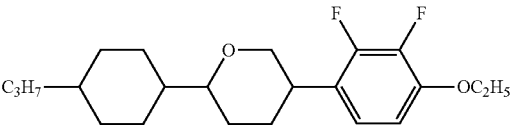

Comparison of Compatibility Between Polymerizable Compound and any Other Liquid Crystal Composition Examples 1 to 8, Comparative Examples 1 to 5

LC-A being a liquid crystal composition containing no first component of the invention was prepared. Components and characteristics of the composition are as described below.

| LC-A | | |
|---|---|---|
| 3-H2B(2F,3F)-O2 | (2-2-1) | 15% |
| 5-H2B(2F,3F)-O2 | (2-2-1) | 10% |
| 3-HBB(2F,3F)-O2 | (2-13-1) | 10% |
| 4-HBB(2F,3F)-O2 | (2-13-1) | 8% |
| 5-HBB(2F,3F)-O2 | (2-13-1) | 5% |
| 3-HHB(2F,3CL)-O2 | (2-16-1) | 4% |
| 4-HHB(2F,3CL)-O2 | (2-16-1) | 3% |
| 3-HBB(2F,3CL)-O2 | (2-17-1) | 4% |
| 2-HH-3 | (3-1-1) | 25% |
| 3-HH-4 | (3-1-1) | 10% |
| 3-HHB-1 | (3-5-1) | 3% |
| 3-HHB-O1 | (3-5) | 3% |

NI=77.5° C.; Δn=0.089; Δε=−2.9.

Predetermined amounts of polymerizable compounds (1-1-1-1), (1-1-1-2) and (4-2-1) were added to 100 parts of liquid crystal composition LC-A described above, respectively, and the resulting mixture was heated at 120° C. for 5 minutes to obtain polymerizable liquid crystal compositions PLC-A-1-1 to PLC-A-3-4.

(1-1-1-1)

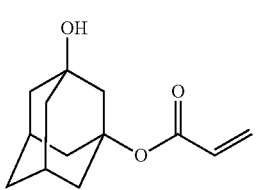

-continued

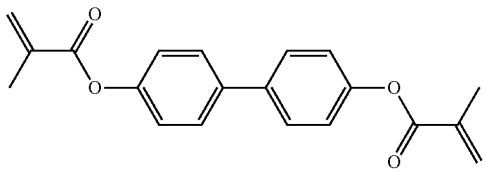

(4-2-1)

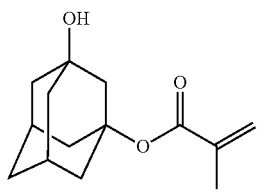

(1-1-1-2)

Compatibility was evaluated for all the liquid crystal compositions. Evaluation results are shown in Table 4. In addition, as a solubility evaluation, a polymerizable liquid crystal composition in a glass vial was allowed to stand for one week at a predetermined temperature, and then presence or absence of crystal precipitation was visually confirmed. With regard to a symbol in Table 4, a symbol "Good" represents absence of crystal precipitation, and a symbol "Poor" represents presence of crystal precipitation.

Comparison of Residual Monomer Concentration and Pretilt Angle

Example 9

To 100 parts of liquid crystal composition LC-A described above, 0.3 part of a polymerizable compound represented by general formula 1-1-1 described below was added and uniformly dissolved thereinto to prepare polymerizable liquid crystal composition PLC-A-1-5. Values of NI, $\Delta n$ and $\Delta \varepsilon$ of PLC-A-1-5 were confirmed to be have almost no difference from values of LC-A. A residual monomer amount (ReM) of polymerizable liquid crystal composition PLC-A-1-5 after exposure with ultraviolet light was 0.18 part, and polymerizable liquid crystal composition PLC-A-1-5 was confirmed to have a good polymerization reactivity. Moreover, while a pretilt angle (Pt) of polymerizable liquid crystal composition PLC-A-1-5 before irradiation with ultraviolet light was 0.2 degree, a pretilt angle (Pt) after irradiation with ultraviolet light was 1.3 degrees. Thus, polymerizable liquid crystal composition PLC-A-1-5 was confirmed to have good pretilt-giving characteristics.

Examples 10 to 22

Residual monomer concentrations (ReM) and pretilt angles (Pt) before and after exposure with ultraviolet light in Examples 10 to 22 and Comparative Examples 6 to 12 were measured in a manner similar to Example 9.

TABLE 4

| | | Polymerizable compound | | Compatibility evaluation results | |
|---|---|---|---|---|---|
| | | | | Temperature | Temperature |
| | Sample No. | Name of polymerizable compound | Amount of polymerizable compound (part) | at which the sample was allowed to stand = 25° C. | at which the sample was allowed to stand = 0° C. |
| Example 1 | PLC-A-1-1 | 1-1-1-1 | 0.5 | Good | Good |
| Example 2 | PLC-A-1-2 | 1-1-1-1 | 0.8 | Good | Good |
| Example 3 | PLC-A-1-3 | 1-1-1-1 | 1.0 | Good | Good |
| Example 4 | PLC-A-1-4 | 1-1-1-1 | 1.5 | Good | Good |
| Example 5 | PLC-A-2-1 | 1-1-1-2 | 0.5 | Good | Good |
| Example 6 | PLC-A-2-2 | 1-1-1-2 | 0.8 | Good | Good |
| Example 7 | PLC-A-2-3 | 1-1-1-2 | 1.0 | Good | Good |
| Example 8 | PLC-A-2-4 | 1-1-1-2 | 1.5 | Good | Good |
| Comparative Example 1 | PLC-A-3-1 | 4-2-1 | 0.5 | Good | Good |
| Comparative Example 2 | PLC-A-3-2 | 4-2-1 | 0.8 | Good | Poor |
| Comparative Example 3 | PLC-A-3-3 | 4-2-1 | 1.0 | Good | Poor |
| Comparative Example 4 | PLC-A-3-4 | 4-2-1 | 1.5 | Poor | Poor |
| Comparative Example 5 | PLC-A | — | — | Good | Good |

As was verified from Table 4, the polymerizable liquid crystal composition containing polymerizable compounds (1-1-1-1) and (1-1-1-2) of the invention is found to have a better compatibility in comparison with the polymerizable liquid crystal composition containing known polymerizable compound (4-2-1) for the PSA mode. More specifically, in the polymerizable liquid crystal composition of the invention, the polymerizable compound with a high concentration can be used, and therefore better pretilt-giving characteristics can be obtained in comparison with the composition in which the known polymerizable compound was used.

Comparative Examples 6 to 12

Residual monomer concentrations (ReM) and pretilt angles (Pt) before and after exposure with ultraviolet light in Comparative Examples 6 to 12 were measured.

Compounds (4-1-1) and (4-2-1) used in Comparative Examples 6 and 7 were known polymerizable compounds for the PSA mode. On the other hand, compounds (5-1) to (5-4) used in Comparative Examples 8 to 12 were polymerizable compounds that have one polymerizable group but no polar group having a capability of a hydrogen bond donor being characteristics of the invention. In addition, as compounds (5-1) and (5-4), commercial items made by Tokyo Chemical Industry Co., Ltd. were used, as compound (5-2), a commercial item made by Sigma-Aldrich Co. LLC. was used, and as compound (5-3), a commercial item made by Kyoeisha Chemical Co., Ltd. was used. Results are shown in Table 5.

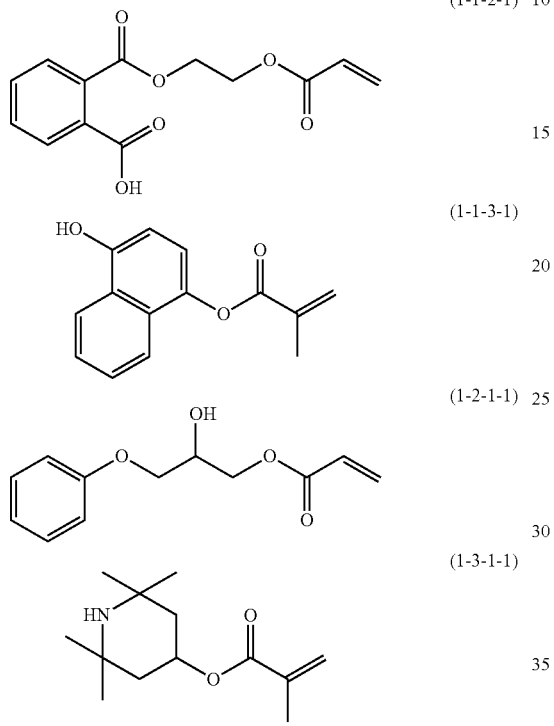

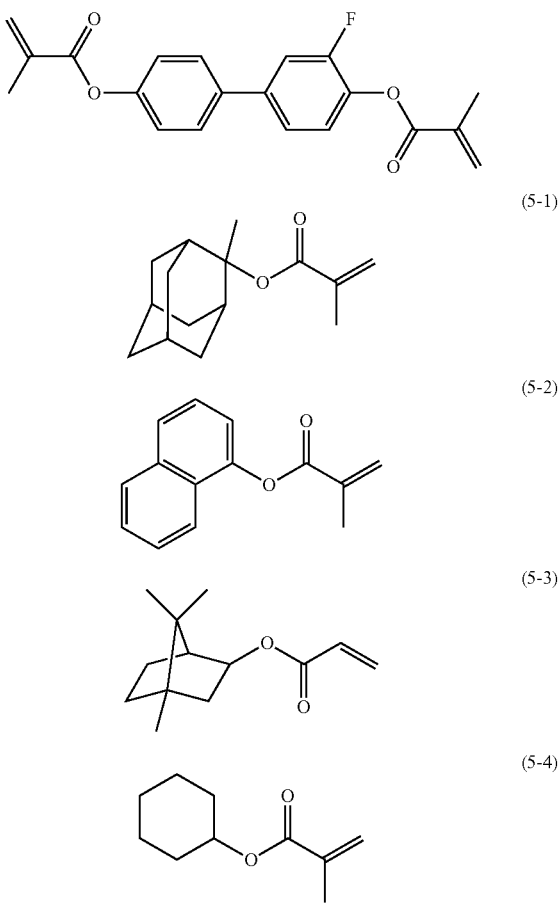

TABLE 5

| Sample No. | Liquid crystal composition Name of composition | Amount of composition (part) | Polymerizable compound Name of polymerizable compound | Amount of polymerizable compound (part) | Residual monomer concentration (part) | Pretilt angle (°) Before exposure with UV | Pretilt angle (°) After exposure with UV |
|---|---|---|---|---|---|---|---|
| Example 9 | PLC-A-1-5 | LC-A | 100 | 1-1-1-1 | 0.30 | 0.18 | 0.2 | 1.3 |
| Example 10 | PLC-A-1-1 | LC-A | 100 | 1-1-1-1 | 0.50 | 0.28 | 0.2 | 3.86 |
| Example 11 | PLC-A-2-5 | LC-A | 100 | 1-1-1-2 | 0.30 | 0.21 | 0.2 | 1.0 |
| Example 12 | PLC-A-2-1 | LC-A | 100 | 1-1-1-2 | 0.50 | 0.35 | 0.2 | 3.27 |
| Example 13 | PLC-A-4-1 | LC-A | 100 | 1-1-2-1 | 0.30 | 0.15 | 0.2 | 0.3 |
| Example 14 | PLC-A-4-2 | LC-A | 100 | 1-1-2-1 | 0.50 | 0.24 | 0.2 | 0.6 |
| Example 15 | PLC-A-4-3 | LC-A | 100 | 1-1-2-1 | 0.80 | 0.37 | 0.2 | 1.0 |
| Example 16 | PLC-A-5-1 | LC-A | 100 | 1-1-3-1 | 0.30 | 0.14 | 0.2 | 0.4 |
| Example 17 | PLC-A-5-2 | LC-A | 100 | 1-1-3-1 | 0.40 | 0.16 | 0.2 | 0.8 |
| Example 18 | PLC-A-5-3 | LC-A | 100 | 1-1-3-1 | 0.50 | 0.20 | 0.2 | 1.6 |
| Example 19 | PLC-A-6-1 | LC-A | 100 | 1-2-1-1 | 0.30 | 0.10 | 0.2 | 0.2 |
| Example 20 | PLC-A-6-2 | LC-A | 100 | 1-2-1-1 | 0.80 | 0.40 | 0.2 | 0.9 |
| Example 21 | PLC-A-7-1 | LC-A | 100 | 1-3-1-1 | 0.30 | 0.10 | 0.2 | 0.2 |
| Example 22 | PLC-A-7-2 | LC-A | 100 | 1-3-1-1 | 0.80 | 0.42 | 0.2 | 0.8 |
| Comparative Example 6 | PLC-A-3-5 | LC-A | 100 | 4-2-1 | 0.30 | 0.25 | 0.2 | 0.6 |
| Comparative Example 7 | PLC-A-8 | LC-A | 100 | 4-1-1 | 0.30 | 0.24 | 0.2 | 0.7 |
| Comparative Example 8 | PLC-A-9-1 | LC-A | 100 | 5-1 | 0.30 | 0.24 | 0.2 | 0.2 |
| Comparative Example 9 | PLC-A-9-2 | LC-A | 100 | 5-1 | 0.80 | 0.62 | 0.2 | 0.2 |
| Comparative Example 10 | PLC-A-10 | LC-A | 100 | 5-2 | 0.30 | 0.28 | 0.2 | 0.2 |

TABLE 5-continued

| | Sample No. | Liquid crystal composition | | Polymerizable compound | | Residual monomer concentration (part) | Pretilt angle (°) | |
|---|---|---|---|---|---|---|---|---|
| | | Name of composition | Amount of composition (part) | Name of polymerizable compound | Amount of polymerizable compound (part) | | Before exposure with UV | After exposure with UV |
| Comparative Example 11 | PLC-A-11 | LC-A | 100 | 5-3 | 0.30 | 0.25 | 0.2 | 0.2 |
| Comparative Example 12 | PLC-A-12 | LC-A | 100 | 5-4 | 0.30 | 0.20 | 0.2 | 0.2 |

As is obvious from Table 5, the polymerizable liquid crystals in which polymerizable compounds (1-1-1-1), (1-1-1-2), (1-1-2-1), (1-1-3-1), (1-2-1-1) and (1-3-1-1) of the invention were used have a higher polymerization reactivity by irradiation with ultraviolet light and can give a higher pretilt angle can be obtained in comparison with the polymerizable liquid crystal in which known polymerizable compounds (4-1-1) and (4-2-1) for the PSA mode were used.

Moreover, the polymerizable liquid crystals in which polymerizable compounds (1-1-1-1), (1-1-1-2), (1-1-2-1), (1-1-3-1), (1-2-1-1) and (1-3-1-1) of the invention were used were found to have superb polymerization reactivity and pretilt-giving characteristics in comparison with the polymerizable liquid crystals in which polymerizable compounds (5-1) to (5-4) having no polar group were used.

Examples 23 to 34, Comparative Examples 13

LC-B to LC-M being liquid crystal compositions containing no first component of the invention were prepared. Components and characteristics of the compositions are as described below.

| LC-B | | |
|---|---|---|
| V-HB(2F,3F)-O2 | (2-1-1) | 15% |
| 5-H2B(2F,3F)-O2 | (2-2-1) | 10% |
| 2-HBB(2F,3F)-O2 | (2-8-1) | 4% |
| 3-HBB(2F,3F)-O2 | (2-8-1) | 10% |
| 5-HBB(2F,3F)-O2 | (2-8-1) | 10% |
| 2-HHB(2F,3CL)-O2 | (2-9-1) | 2% |
| 3-HHB(2F,3CL)-O2 | (2-9-1) | 3% |
| 4-HHB(2F,3CL)-O2 | (2-9-1) | 3% |
| 5-HHB(2F,3CL)-O2 | (2-9-1) | 3% |
| 2-HH-3 | (3-1-1) | 27% |
| 3-HB-O2 | (3-2-1) | 2% |
| 3-HHB-1 | (3-5-1) | 3% |
| 3-HHB-3 | (3-5-1) | 5% |
| 3-HHB-O1 | (3-5-1) | 3% |

NI=78.3° C.; Δn=0.094; Δε=−3.0.

| LC-C | | |
|---|---|---|
| 3-HB(2F,3F)-O2 | (2-1-1) | 6% |
| 3-H2B(2F,3F)-O2 | (2-2-1) | 17% |
| 5-H2B(2F,3F)-O2 | (2-2-1) | 10% |
| 3-HHB(2F,3F)-O2 | (2-5-1) | 7% |
| 5-HHB(2F,3F)-O2 | (2-5-1) | 6% |
| 3-HBB(2F,3F)-O2 | (2-8-1) | 5% |
| 5-HBB(2F,3F)-O2 | (2-8-1) | 10% |
| 2-HH-3 | (3-1-1) | 20% |
| 3-HH-4 | (3-1-1) | 4% |
| 5-HB-O2 | (3-2-1) | 4% |
| 3-HHB-1 | (3-5-1) | 4% |
| 5-HBB(F)B-2 | (3-13-1) | 7% |

NI=76.6° C.; Δn=0.095; Δε=−3.1.

| LC-D | | |
|---|---|---|
| 3-HB(2F,3F)-O2 | (2-1-1) | 6% |
| 3-H2B(2F,3F)-O2 | (2-2-1) | 15% |
| 5-H2B(2F,3F)-O2 | (2-2-1) | 5% |
| 3-BB(2F,3F)-O2 | (2-3-1) | 5% |
| 3-H1OB(2F,3F)-O2 | (2-4-1) | 5% |
| 3-HH2B(2F,3F)-O2 | (2-6-1) | 5% |
| 2-HBB(2F,3F)-O2 | (2-8-1) | 5% |
| 4-HBB(2F,3F)-O2 | (2-8-1) | 6% |
| 5-HBB(2F,3F)-O2 | (2-8-1) | 6% |
| 2-HH-3 | (3-1-1) | 5% |
| 3-HH-4 | (3-1-1) | 10% |
| 1-BB-3 | (3-3-1) | 4% |
| 3-HHB-1 | (3-5-1) | 4% |
| 3-HHB-3 | (3-5-1) | 5% |
| 3-HHB-O1 | (3-5-1) | 3% |
| 5-HBB(F)B-2 | (3-13-1) | 6% |
| 5-HBB(F)B-3 | (3-13-1) | 5% |

NI=87.4° C.; Δn=0.119; Δε=−3.4.

| LC-E | | |
|---|---|---|
| 3-HB(2F,3F)-O2 | (2-1-1) | 10% |
| 3-BB(2F,3F)-O2 | (2-3-1) | 7% |
| 3-H1OB(2F,3F)-O2 | (2-4-1) | 6% |
| 3-HH1OB(2F,3F)-O2 | (2-7-1) | 3% |
| 2-HBB(2F,3F)-O2 | (2-8-1) | 10% |
| 3-HBB(2F,3F)-O2 | (2-8-1) | 5% |
| 3-dhHB(2F,3F)-O2 | (2-14-1) | 3% |
| 3-HH1OCro(7F,8F)-5 | (2-19-1) | 5% |
| 2-HH-5 | (3-1-1) | 10% |
| 3-HH-4 | (3-1-1) | 8% |
| 5-HB-O2 | (3-2-1) | 8% |
| 1-BB-3 | (3-3-1) | 7% |
| 3-HHB-1 | (3-5-1) | 3% |
| 3-HHB-O1 | (3-5-1) | 2% |
| 5-HBB-2 | (3-6-1) | 4% |
| 3-HHEBH-3 | (3-10-1) | 2% |
| 3-HHEBH-5 | (3-10-1) | 2% |
| 3-HBBH-5 | (3-11-1) | 3% |
| 5-HBB(F)B-2 | (3-13-1) | 2% |

NI=87.5° C.; Δn=0.111; Δε=−2.8.

| LC-F | | |
|---|---|---|
| 3-HB(2F,3F)-O2 | (2-1-1) | 10% |
| 3-H2B(2F,3F)-O2 | (2-2-1) | 13% |
| 5-H2B(2F,3F)-O2 | (2-2-1) | 12% |
| 3-BB(2F,3F)-O2 | (2-3-1) | 3% |
| 5-H1OB(2F,3F)-O2 | (2-4-1) | 5% |
| 5-HH1OB(2F,3F)-O2 | (2-7-1) | 6% |
| 5-HBB(2F,3F)-O2 | (2-8-1) | 7% |
| 3-HHB(2F,3CL)-O2 | (2-9-1) | 4% |
| 2-HH-3 | (3-1-1) | 8% |
| 3-HHEH-3 | (3-4-1) | 2% |
| 3-HHEH-5 | (3-4-1) | 2% |
| 4-HHEH-3 | (3-4-1) | 2% |

| LC-F | | |
|---|---|---|
| 4-HHEH-5 | (3-4-1) | 2% |
| 3-HHB-1 | (3-5-1) | 9% |
| 3-HHB-3 | (3-5-1) | 7% |
| 3-HHB-O1 | (3-5-1) | 3% |
| 3-HHEBH-3 | (3-10-1) | 2% |
| 3-HHEBH-5 | (3-10-1) | 3% |

NI=89.8° C.; Δn=0.093; Δε=−4.1.

| LC-G | | |
|---|---|---|
| V-HB(2F,3F)-O2 | (2-1-1) | 6% |
| V-HB(2F,3F)-O3 | (2-1-1) | 5% |
| 3-H2B(2F,3F)-O2 | (2-2-1) | 5% |
| 3-HH1OB(2F,3F)-O2 | (2-7-1) | 5% |
| 4-HBB(2F,3F)-O2 | (2-8-1) | 4% |
| 5-HBB(2F,3F)-O2 | (2-8-1) | 7% |
| 3-HDhB(2F,3F)-O2 | (2-13-1) | 5% |
| 3-dhBB(2F,3F)-O2 | (2-15-1) | 6% |
| 3-HH1OCro(7F,8F)-5 | (2-19-1) | 8% |
| 2-HH-3 | (3-1-1) | 16% |
| 3-HH-5 | (3-1-1) | 5% |
| 3-HB-O1 | (3-2-1) | 6% |
| 1-BB-3 | (3-3-1) | 5% |
| 3-HHB-1 | (3-5-1) | 5% |
| 3-HHB-O1 | (3-5-1) | 3% |
| 3-HBB-2 | (3-6-1) | 6% |
| 3-B(F)BB-2 | (3-8-1) | 3% |

NI=82.5° C.; Δn=0.106; Δε=−3.1.

| LC-H | | |
|---|---|---|
| V-HB(2F,3F)-O2 | (2-1-1) | 10% |
| 3-H2B(2F,3F)-O2 | (2-2-1) | 5% |
| V2-BB(2F,3F)-O2 | (2-3-1) | 5% |
| 3-H1OB(2F,3F)-O2 | (2-4-1) | 6% |
| 3-HBB(2F,3F)-O2 | (2-8-1) | 6% |
| 3-HHB(2F,3CL)-O2 | (2-9-1) | 3% |
| 3-DhHB(2F,3F)-O2 | (2-12-1) | 3% |
| 3-HDhB(2F,3F)-O2 | (2-13-1) | 3% |
| 3-HH1OCro(7F,8F)-5 | (2-19-1) | 5% |
| 2-HH-3 | (3-1-1) | 19% |
| 5-HB-O2 | (3-2-1) | 5% |
| V2-BB-1 | (3-3-1) | 3% |
| 3-HHB-1 | (3-5-1) | 4% |
| 3-HHB-3 | (3-5-1) | 7% |
| 3-HHB-O1 | (3-5-1) | 4% |
| 2-BB(F)B-3 | (3-7-1) | 4% |
| 3-HB(F)BH-3 | (3-12-1) | 3% |
| 5-HBB(F)B-2 | (3-13-1) | 5% |

NI=83.8° C.; Δn=0.111; Δε=−2.6.

| LC-I | | |
|---|---|---|
| V-HB(2F,3F)-O2 | (2-1-1) | 14% |
| 3-H2B(2F,3F)-O4 | (2-2-1) | 5% |
| 3-HBB(2F,3F)-O2 | (2-8-1) | 10% |
| 4-HBB(2F,3F)-O2 | (2-8-1) | 4% |
| 5-HBB(2F,3F)-O2 | (2-8-1) | 5% |
| 3-HH1OCro(7F,8F)-5 | (2-19-1) | 7% |
| 2-HH-3 | (3-1-1) | 23% |
| 3-HH-O1 | (3-1-1) | 5% |
| 3-HH-V | (3-1-1) | 3% |
| 4-HHEH-3 | (3-4-1) | 3% |
| 3-HHB-1 | (3-5-1) | 6% |
| 3-HHB-3 | (3-5-1) | 6% |
| 3-HHB-O1 | (3-5-1) | 3% |

| LC-I | | |
|---|---|---|
| 2-BB(F)B-5 | (3-7-1) | 3% |
| 3-B(F)BB-2 | (3-8-1) | 3% |

NI=81.3° C.; Δn=0.098; Δε=−2.6.

| LC-J | | |
|---|---|---|
| 3-H2B(2F,3F)-O2 | (2-2-1) | 20% |
| 2-HHB(2F,3F)-O2 | (2-5-1) | 7% |
| 3-HH1OB(2F,3F)-O2 | (2-7-1) | 10% |
| 3-HH1OB(2F,3F)-1 | (2-7-1) | 3% |
| 3-HBB(2F,3F)-O2 | (2-8-1) | 9% |
| 3-HHB(2F,3CL)-O2 | (2-9-1) | 5% |
| 2-HH-5 | (3-1-1) | 4% |
| 3-HH-4 | (3-1-1) | 15% |
| 3-HH-V | (3-1-1) | 8% |
| 3-HH-V1 | (3-1-1) | 4% |
| 3-HB-O2 | (3-2-1) | 6% |
| 3-HHB-3 | (3-5-1) | 6% |
| 3-HB(F)HH-2 | (3-9-1) | 3% |

NI=81.9° C.; Δn=0.084; Δε=−2.8.

| LC-K | | |
|---|---|---|
| V-HB(2F,3F)-O2 | (2-1-1) | 6% |
| 3-H2B(2F,3F)-O2 | (2-2-1) | 5% |
| 3-BB(2F,3F)-O2 | (2-3-1) | 5% |
| 3-HH1OB(2F,3F)-O2 | (2-7-1) | 5% |
| 4-HBB(2F,3F)-O2 | (2-8-1) | 4% |
| 5-HBB(2F,3F)-O2 | (2-8-1) | 7% |
| 3-HDhB(2F,3F)-O2 | (2-13-1) | 5% |
| 3-dhBB(2F,3F)-O2 | (2-15-1) | 6% |
| 3-HH1OCro(7F,8F)-5 | (2-19-1) | 8% |
| 2-HH-3 | (3-1-1) | 16% |
| 3-HH-5 | (3-1-1) | 5% |
| 3-HB-O1 | (3-2-1) | 6% |
| 1-BB-3 | (3-3-1) | 5% |
| 3-HHB-1 | (3-5-1) | 5% |
| 3-HHB-O1 | (3-5-1) | 3% |
| 3-HBB-2 | (3-6-1) | 6% |
| 3-B(F)BB-2 | (3-8-1) | 3% |

NI=84.1° C.; Δn=0.112; Δε=−3.1.

| LC-L | | |
|---|---|---|
| 3-H2B(2F,3F)-O2 | (2-2-1) | 15% |
| 5-BB(2F,3F)-O2 | (2-3-1) | 5% |
| 2-HHB(2F,3F)-O2 | (2-5-1) | 7% |
| 3-HH1OB(2F,3F)-O2 | (2-7-1) | 10% |
| 3-HH1OB(2F,3F)-1 | (2-7-1) | 3% |
| 3-HBB(2F,3F)-O2 | (2-8-1) | 9% |
| 3-HHB(2F,3CL)-O2 | (2-9-1) | 5% |
| 2-HH-5 | (3-1-1) | 4% |
| 3-HH-4 | (3-1-1) | 15% |
| 3-HH-V | (3-1-1) | 8% |
| 3-HH-V1 | (3-1-1) | 4% |
| 3-HB-O2 | (3-2-1) | 6% |
| 3-HHB-3 | (3-5-1) | 6% |
| 3-HB(F)HH-2 | (3-9-1) | 3% |

NI=82.0° C.; Δn=0.087; Δε=−2.8.

| LC-M | | |
|---|---|---|
| 5-H2B(2F,3F)-O2 | (2-2-1) | 17% |
| 3-BB(2F,3F)-O2 | (2-3-1) | 5% |

-continued

| LC-M | | |
|---|---|---|
| 3-HH1OB(2F,3F)-O2 | (2-7-1) | 8% |
| 3-HHB(2F,3CL)-O2 | (2-9-1) | 4% |
| 4-HHB(2F,3CL)-O2 | (2-9-1) | 3% |
| 5-HHB(2F,3CL)-O2 | (2-9-1) | 3% |
| 3-HBB(2F,3CL)-O2 | (2-10-1) | 8% |
| 2-BB(2F,3F)B-3 | (2-11-1) | 4% |
| 3-HH2B(2F,3F,6Me)-O2 | (2-16-1) | 3% |
| 3-HH1OB(2F,3F,6Me)-O2 | (2-17-1) | 3% |
| 5-H1OCro(7F,8F)-5 | (2-18-1) | 3% |
| 3-HH-V | (3-1-1) | 27% |
| V-HHB-1 | (3-5-1) | 7% |
| 2-BB(F)B-3 | (3-7-1) | 2% |
| 3-HHEBH-3 | (3-10-1) | 3% |

NI=82.4° C.; Δn=0.098; Δε=−2.9.

Residual monomer concentrations (ReM) and pretilt angles (Pt) before and after exposure with ultraviolet light in Examples 23 to 34 and Comparative Example 13 were measured, by using liquid crystal compositions LC-B to LC-M and polymerizable compounds (1-1-1-2) and (4-1-1) adjusted prepared as described above, in a manner similar to Example 9. The results are shown in Table 6.

TABLE 6

| | Sample No. | Liquid crystal composition | | Polymerizable compound | | Residual monomer concentration (ReW; part) | Pretilt angle (Pt; °) | |
|---|---|---|---|---|---|---|---|---|
| | | Name of composition | Amount of composition (part) | Name of polymerizable compound | Amount of polymerizable compound (part) | | Before exposure with UV | After exposure with UV |
| Example 23 | PLC-B1 | LC-B | 100 | 1-1-1-2 | 0.30 | 0.22 | 0.2 | 0.9 |
| Example 24 | PLC-C-1 | LC-C | 100 | 1-1-1-2 | 0.30 | 0.21 | 0.2 | 1.1 |
| Example 25 | PLC-D-1 | LC-D | 100 | 1-1-1-2 | 0.30 | 0.20 | 0.2 | 1.0 |
| Example 26 | PLC-E-1 | LC-E | 100 | 1-1-1-2 | 0.30 | 0.19 | 0.2 | 1.2 |
| Example 27 | PLC-F-1 | LC-F | 100 | 1-1-1-2 | 0.30 | 0.18 | 0.2 | 1.2 |
| Example 28 | PLC-G-1 | LC-G | 100 | 1-1-1-2 | 0.30 | 0.23 | 0.2 | 0.8 |
| Example 29 | PLC-H-1 | LC-H | 100 | 1-1-1-2 | 0.30 | 0.23 | 0.2 | 0.8 |
| Example 30 | PLC-I-1 | LC-I | 100 | 1-1-1-2 | 0.30 | 0.21 | 0.2 | 0.9 |
| Example 31 | PLC-J-1 | LC-J | 100 | 1-1-1-2 | 0.30 | 0.22 | 0.2 | 0.9 |
| Example 32 | PLC-K-1 | LC-K | 100 | 1-1-1-2 | 0.30 | 0.21 | 0.2 | 1.0 |
| Example 33 | PLC-L-1 | LC-L | 100 | 1-1-1-2 | 0.30 | 0.22 | 0.2 | 0.9 |
| Example 34 | PLC-M-1 | LC-M | 100 | 1-1-1-2 | 0.30 | 0.24 | 0.2 | 0.7 |
| Comparative Example 13 | PLC-B-2 | LC-B | 100 | 4-1-1 | 0.30 | 0.25 | 0.2 | 0.6 |

From the results in Table 6, both the polymerization reactivity and the pretilt-giving characteristics were found to be superb in Examples 23 to 34 in comparison with Comparative Example 13. Accordingly, the liquid crystal composition for the a-PSA mode according to the invention is concluded to have superb characteristics in comparison with the existing liquid crystal composition for the PSA mode.

INDUSTRIAL APPLICABILITY

A liquid crystal composition of the invention contains a polymerizable compound, and satisfies at least one of characteristics such as a high maximum temperature, a low minimum temperature, a small viscosity, a suitable optical anisotropy, a large negative dielectric anisotropy and a large specific resistance, or has a suitable balance regarding at least two of the characteristics. A liquid crystal display device containing the composition can be widely used for a liquid crystal projector, a liquid crystal television and so forth.

What is claimed is:

1. A liquid crystal composition containing at least one compound selected from compounds represented by formula (1) as a first component that has a capability of a hydrogen bond donor and can form a hydrogen bond with an alignment film surface, an oligomer of the monomer, a prepolymer of the monomer or a polymer of the monomer, wherein a proportion of the first component when the weight of the liquid crystal composition excluding the first component and a polymerizable compound other than the first component is taken as 100 parts by weight is in the range of 0.05 part by weight to 10 parts by weight and a sum of the proportion of the first component and a proportion of the polymerizable compound other than the first component is in the range of 0.05 part by weight to 10 parts by weight:

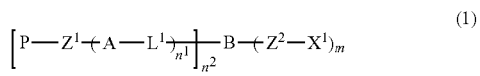

(1)

wherein, in formula (1), P is a polymerizable group having 3 to 20 carbons and one or more groups selected from α,β-unsaturated ester and cyclic ether, in which at least one of hydrogen may be replaced by halogen; A is a divalent group derived from a ring selected from adamantane, noradamantane, diamantane, triamantane, norbornene, norbornane, phthalan, coumaran, 1,2-methylenedioxybenzene, chroman, benzene, naphthalene, cyclohexane, cyclohexene, tetrahydropyran, dioxane, pyrimidine and pyridine, or a single bond, in which at least one of hydrogen may be replaced by halogen, alkyl having 1 to 12 carbons, or alkyl having 1 to 12 carbons in which at least one of hydrogen is replaced by halogen, B is a (n²+m)-valent group derived from a ring selected from adamantane, noradamantane, diamantane, triamantane, norbornene, norbornane, phthalan, coumaran,1,2-methylenedioxybenzene, chroman, benzene, naphthalene, cyclohexane, cyclohexene, tetrahydropyran, dioxane, pyrimidine and pyridine, or a single bond, in which at least one of hydrogen may be replaced by halogen, alkyl having 1 to 12 carbons, or alkyl having 1 to 12 carbons in which at least one of hydrogen is replaced by halogen;

$X^1$ is —H, —OH, —NH$_2$, —NHR$^1$, —SH or a heterocycle having 3 to 20 carbons and containing one or more of —NH—, and in the heterocycle, at least one of hydrogen may be replaced by halogen, in which, when both A and B are a single bond, $X^1$ is a heterocycle having 3 to 20 carbons and containing at least one of —NH—, and in the heterocycle, at least one of hydrogen may be replaced by halogen; $R^1$ is alkyl having 1 to 6 carbons; $Z^1$ and $Z^2$ are independently a single bond or alkylene having 1 to 10 carbons, and in the alkylene, at least one of —CH$_2$— may be replaced by —O—, —COO—, —OCO— or —OCOO—, at least one of —CH$_2$—CH$_2$— may be replaced by —CH=CH— or —C≡C—, and when P is a polymerizable group having a cyclic ether group, $Z^1$ is alkylene having 1 to 10 carbons in which at least one of —CH$_2$— is replaced by —O—, —COO—, —OCO— or —OCOO—, and when $X^1$ is hydrogen, $Z^1$ is alkylene having 1 to 10 carbons in which at least one of hydrogen is replaced by —OH or —COOH; $L^1$ is a single bond or alkylene having 1 to 10 carbons, and in the alkylene, at least one of —CH$_2$— may be replaced by —O—, —COO—, —OCO— or —OCOO—, and at least one of —CH$_2$—CH$_2$— may be replaced by —CH=CH— or —C≡C—; m is 1, 2 or 3; $n^1$ is 0, 1, 2, 3 or 4; $n^2$ is 1, 2 or 3; and ($n^2$+m) is an integer from 2 to 5.

2. The liquid crystal composition according to claim 1, wherein, in formula (1) described in claim 1, P is a group selected from groups represented by formulas (P-1) to (P-4):

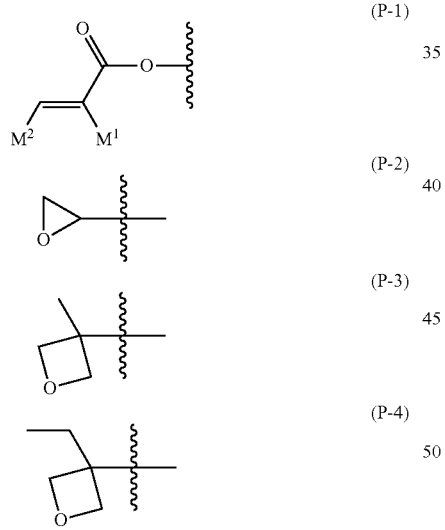

wherein, in formula (P-1), $M^1$ and $M^2$ are independently hydrogen, fluorine, methyl or trifluoromethyl;

A is a divalent group derived from a ring selected from adamantane, noradamantane, diamantane, norbomane, benzene and naphthalene, or a single bond, in which at least one of hydrogen may be replaced by halogen, alkyl having 1 to 6 carbons, or alkyl having 1 to 6 carbons in which at least one of hydrogen is replaced by halogen, B is a ($n^2$+m)-valent group derived from a ring selected from adamantane, noradamantane, diamantane, norbomane, benzene and naphthalene, or a single bond, in which at least one of hydrogen may be replaced by halogen, alkyl having 1 to 6 carbons, or alkyl having 1 to 6 carbons in which at least one of hydrogen is replaced by halogen;

$X^1$ is —H, —OH, —NH$_2$, —SH or a group represented by formulas (X-1) to (X-3), in which, when both A and B are a single bond, $X^1$ is a group represented by formulas (X-1) to (X-3); and $R^1$ is alkyl having 1 to 4 carbons;

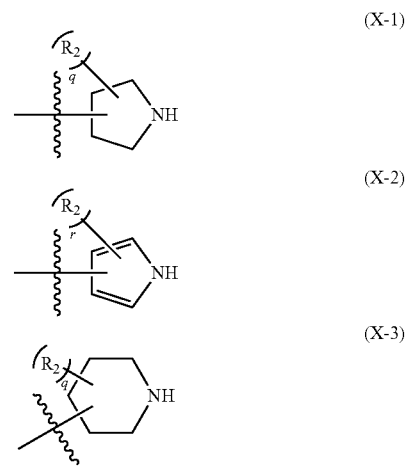

wherein, $R^2$ is alkyl having 1 to 4 carbons; $Z^1$ and $Z^2$ are independently a single bond or alkylene having 1 to 4 carbons, and in the alkylene, at least one of —CH$_2$— may be replaced by —O—, —COO—, —OCO— or —OCOO—, and when $X^1$ is a group represented by —H, $Z^1$ has —OH or —COOH;

$L^1$ is a single bond or alkylene having 1 to 4 carbons, and in the alkylene, at least one of —CH$_2$— may be replaced by —O—, —COO—, —OCO— or —OCOO—, and at least one of —CH$_2$—CH$_2$— may be replaced by —CH=CH— or —C≡C—; m is 1 or 2; n is 0, 1 or 2; q is 0, 1, 2, 3 or 4; r is 0, 1, 2 or 3; and ($n^2$+m) is an integer from 2 to 5.

3. The liquid crystal composition according to claim 2, wherein the first component is at least one compound selected from the group of compounds represented by formulas (1-1) to (1-3):

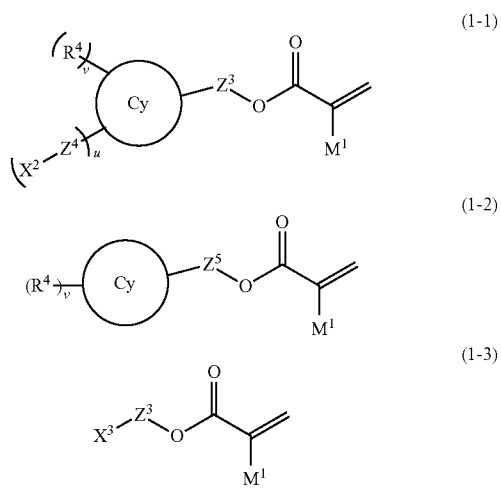

wherein, Cy is a $w^2$-valent group derived from a ring selected from adamantane, benzene, naphthalene, norbornane and biphenyl; $M^1$ is methyl or hydrogen; $R^4$ is alkyl having 1 to 3 carbons; $X^2$ is —OH, —NH$_2$, —NHR$^1$ or —SH; $X^3$ is a group represented by formulas (X-1) to (X-3) described in claim 2; and $R^1$ is alkyl having 1 to 4 carbons;

$Z^3$ and $Z^4$ are independently a single bond or alkylene having 1 to 4 carbons, and in the alkylene, at least one of —CH$_2$— may be replaced by —O—, —COO—, —OCO— or —OCOO—; $Z^5$ is alkylene having 1 to 4 carbons, and in the alkylene, one or two of hydrogens are replaced by —OH or —COOH, and at least one of —CH$_2$— may be replaced by —O—, —COO—, —OCO— or —OCOO—; u is 1 or 2; v is 0, 1 or 2; $w^2$ is an integer from 2 to 5; q is 0, 1, 2, 3 or 4; and r is 0, 1 or 2.

4. The liquid crystal composition according to claim 3, wherein, in formulas (1-1) to (1-3) described in claim 3, $X^2$ is —OH or —NH$_2$; $Z^3$ and $Z^4$ are a single bond; and $Z^5$ is alkylene having 1 to 2 carbons, and in the alkylene, one or two of hydrogens are replaced by —OH or —COOH, and at least one of —CH$_2$— may be replaced by —O—, —COO—, —OCO— or —OCOO—.

5. The liquid crystal composition according to claim 1, wherein the first component is at least one compound selected from the group of compounds represented by formulas (1-1-1), (1-1-2), (1-1-3), (1-2-1) and (1-3-1):

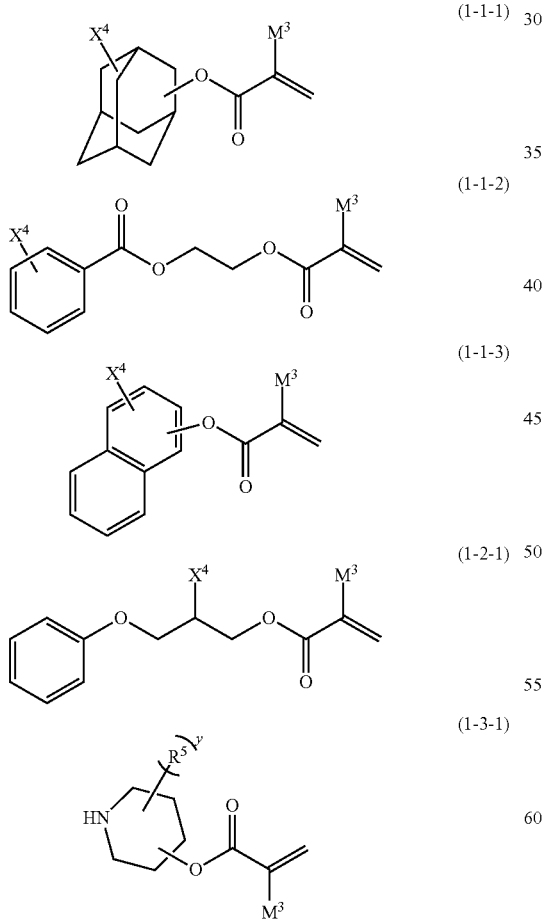

wherein, $X^4$ is —OH; $M^3$ is hydrogen or methyl; $R^5$ is methyl or ethyl; and y is 0, 1, 2, 3 or 4.

6. The liquid crystal composition according to claim 5, containing a compound represented by formula (1-1-1) described in claim 5.

7. The liquid crystal composition according to claim 1, further containing at least one compound selected from compounds represented by formula (2) as a second component:

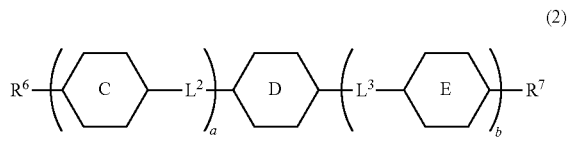

wherein, $R^6$ and $R^7$ are independently alkyl having 1 to 12 carbons, alkoxy having 1 to 12 carbons or alkenyl having 2 to 12 carbons, or alkenyl having 2 to 12 carbons in which at least one of hydrogen is replaced by fluorine; C and E are independently 1,4-cyclohexylene, 1,4-phenylene, 1,4-phenylene in which at least one of hydrogen is replaced by fluorine or chlorine, or tetrahydropyran-2,5-diyl; D is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; $L^2$ and $L^3$ are independently a single bond, ethylene, methyleneoxy or carbonyloxy; a is 1, 2 or 3; b is 0 or 1; and a sum of a and b is 3 or less.

8. The liquid crystal composition according to claim 7, wherein the second component is at least one compound selected from the group of compounds represented by formulas (2-1) to (2-19):

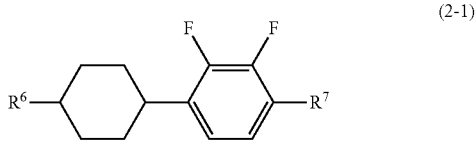

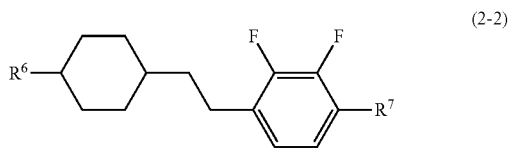

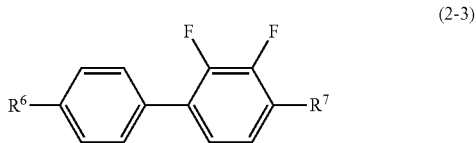

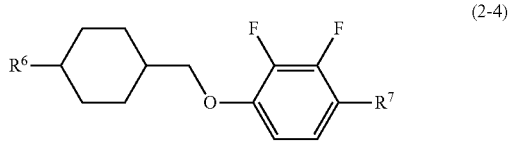

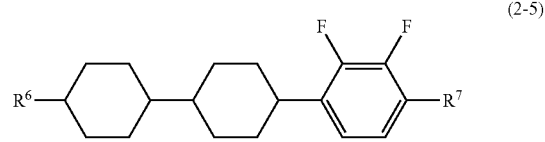

-continued (2-6) 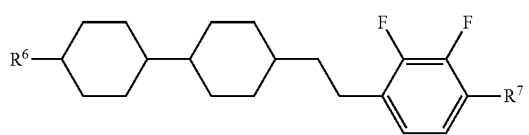

(2-7) 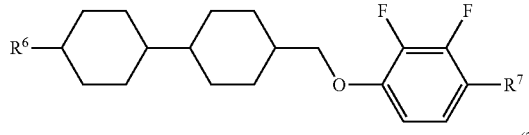

(2-8) 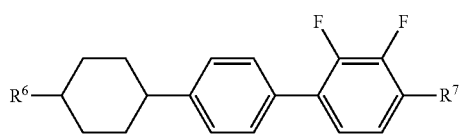

(2-9) 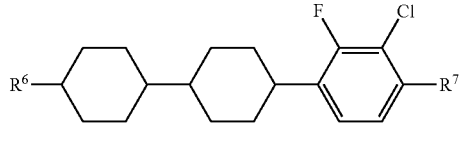

(2-10) 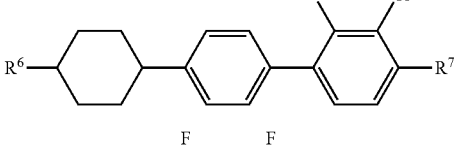

(2-11) 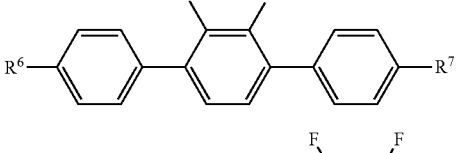

(2-12) 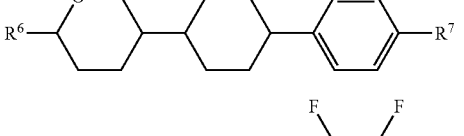

(2-13) 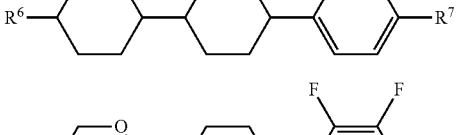

(2-14) 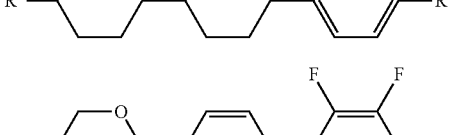

(2-15) 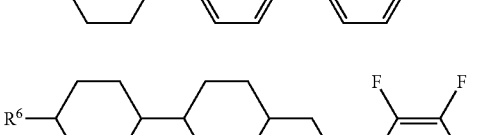

-continued (2-17) 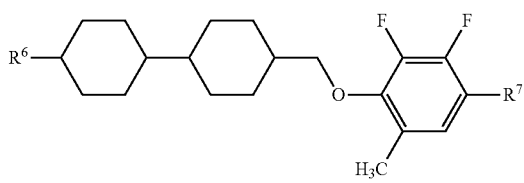

(2-18) 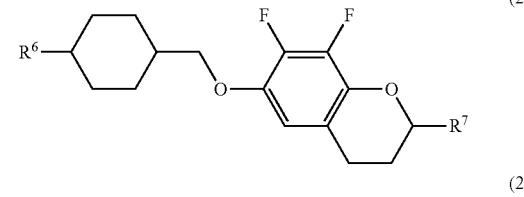

(2-19) 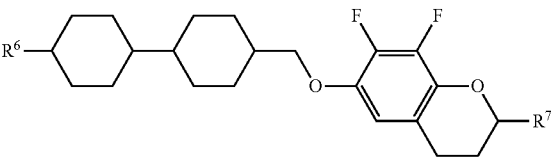

wherein, $R^6$ and $R^7$ are independently alkyl having 1 to 12 carbons, alkoxy having 1 to 12 carbons or alkenyl having 2 to 12 carbons.

9. The liquid crystal composition according to claim 7, wherein a proportion of the second component is in the range of 10% by weight to 100% by weight, based on the weight of a liquid crystal composition excluding the first component and the polymerizable compound other than the first component.

10. The liquid crystal composition according to claim 1, further containing at least one compound selected from compounds represented by formula (3) as a third component:

(3) 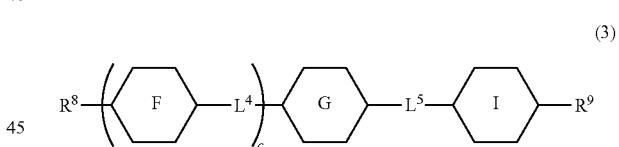

wherein, $R^8$ and $R^9$ are independently alkyl having 1 to 12 carbons, alkoxy having 1 to 12 carbons or alkenyl having 2 to 12 carbons, or alkenyl having 2 to 12 carbons in which at least one of hydrogen is replaced by fluorine; F, G and I are independently 1,4-cyclohexylene, 1,4-phenylene, 2-fluoro-1,4-phenylene or 3-fluoro-1,4-phenylene; $L^4$ and $L^5$ are independently a single bond, ethylene, methyleneoxy or carbonyloxy; and c is 0, 1 or 2.

11. The liquid crystal composition according to claim 10, containing at least one compound selected from the group of compounds represented by formulas (3-1) to (3-13) as the third component:

(3-1) 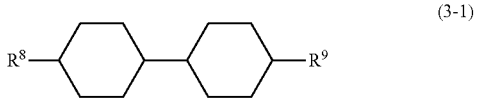

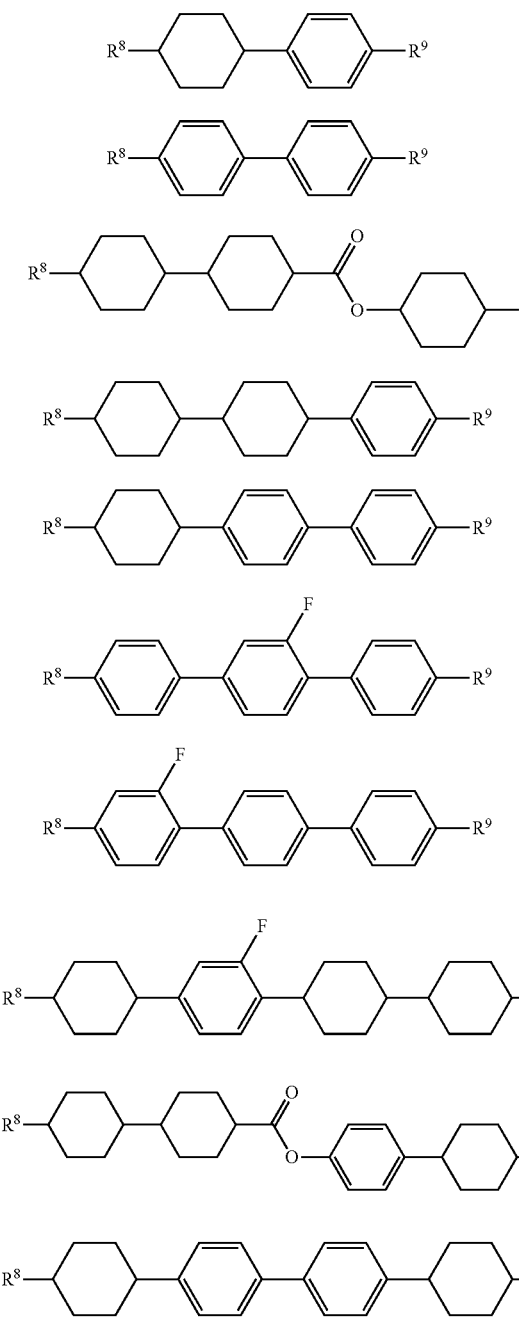

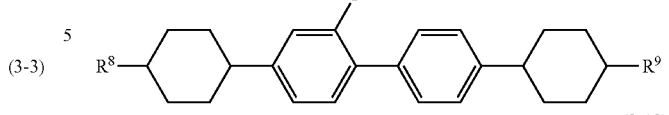

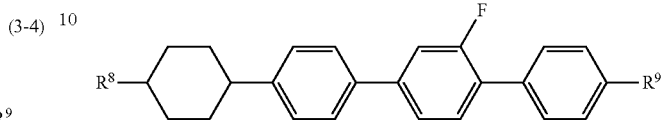

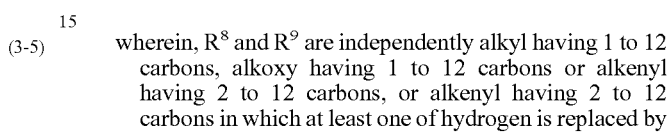

wherein, $R^8$ and $R^9$ are independently alkyl having 1 to 12 carbons, alkoxy having 1 to 12 carbons or alkenyl having 2 to 12 carbons, or alkenyl having 2 to 12 carbons in which at least one of hydrogen is replaced by fluorine.

12. The liquid crystal composition according to claim 10, wherein a proportion of the second component is in the range of 10% by weight to 80% by weight, based on the weight of a liquid crystal composition excluding the first component and a polymerizable compound other than the first component, a proportion of the third component is in the range of 20% by weight to 90% by weight, a proportion of the first component when the weight of the liquid crystal composition excluding the first component and the polymerizable compound other than the first component is taken as 100 parts by weight is in the range of 0.05 part by weight to 10 parts by weight, and a proportion of the polymerizable compound is in the range of 0.05 part by weight to 10 parts by weight.

13. The liquid crystal composition according to claim 1, further containing a polymerization initiator.

14. The liquid crystal composition according to claim 1, further containing a polymerization inhibitor.

15. The liquid crystal composition according to claim 1, wherein a maximum temperature of a nematic phase is 70° C. or higher, an optical anisotropy (25° C.) at a wavelength of 589 nanometers is 0.08 or more, and a dielectric anisotropy (25° C.) at a frequency of 1 kHz is −2 or less.

16. A polymer sustained alignment mode liquid crystal display device, wherein the liquid crystal display device comprises two substrates having an electrode layer on at least one of the substrates, and a liquid crystal material containing a compound in which a polymerizable compound in the liquid crystal composition according to claim 1 is polymerized is arranged between the two substrates.

17. The liquid crystal display device according to claim 16, wherein a driving mode in the liquid crystal display device is an active matrix mode.

\* \* \* \* \*